United States Patent
Sato

(10) Patent No.: US 7,646,959 B2
(45) Date of Patent: Jan. 12, 2010

(54) PLASTIC OPTICAL FIBER AND MANUFACTURING METHOD THEREOF, AND OPTICAL TRANSMISSION SYSTEM

(75) Inventor: Masataka Sato, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/160,165

(22) PCT Filed: Jan. 18, 2007

(86) PCT No.: PCT/JP2007/051114

§ 371 (c)(1),
(2), (4) Date: Jul. 7, 2008

(87) PCT Pub. No.: WO2007/083832

PCT Pub. Date: Jul. 26, 2007

(65) Prior Publication Data

US 2009/0003834 A1 Jan. 1, 2009

(30) Foreign Application Priority Data

Jan. 20, 2006 (JP) ............................. 2006-012831

(51) Int. Cl.
*G02B 6/00* (2006.01)
*H04B 10/12* (2006.01)

(52) U.S. Cl. ...................... 385/142; 385/143; 264/1.24

(58) Field of Classification Search ................... 385/88, 385/124, 140, 141, 142, 143; 264/1.24, 2.7, 264/171.1, 2.55
See application file for complete search history.

(56) References Cited

U.S. PATENT DOCUMENTS

| 7,058,271 B2 * | 6/2006 | Koike et al. .................. 385/124 |
| 2004/0024157 A1 | 2/2004 | Okazaki et al. |
| 2006/0121226 A1 * | 6/2006 | Shirokura et al. ........... 428/36.9 |
| 2007/0274642 A1 * | 11/2007 | Inujima et al. ................. 385/88 |
| 2009/0098401 A1 * | 4/2009 | Yamaki et al. ............ 428/542.8 |

FOREIGN PATENT DOCUMENTS

| JP | 60-125810 A | 7/1985 |
| JP | 10-096825 A | 4/1998 |
| JP | 10-239534 A | 9/1998 |
| JP | 11-344623 A | 12/1999 |
| JP | 2003-321514 A | 11/2003 |

* cited by examiner

*Primary Examiner*—Akm E Ullah
(74) *Attorney, Agent, or Firm*—Sughrue Mion, PLLC

(57) ABSTRACT

A POF (12) comprises a core (65) having a radius of R1, an outer shell (66) and an outermost shell (67). The core (65) includes concentric layers. A first layer (61) is at the periphery side and an nth layer (64) is at the center of the core (65). The refractive index increases from the first layer (61) to the nth layer (64). The refractive index N(r) at a position where a distance r apart in a radius direction from the center of the core (65) having a radius of R1 is satisfied following equations (1) and (2) when the center of a cross-sectional circle of the core (65) has the refractive index of N1, the outermost part of the core (65) has the refractive index of N2, and a refractive index distribution coefficient is shown as g:

$N(r)=N1[1-2\Delta(r/R1)^g]^{1/2}$ [Equation (1)]

$\Delta=(N1^2-N2^2)/(2N1^2)$. [Equation (2)]

9 Claims, 12 Drawing Sheets

PLASTIC OPTICAL FIBER AND MANUFACTURING METHOD THEREOF, AND OPTICAL TRANSMISSION SYSTEM

TECHNICAL FIELD

The present invention relates to a plastic optical fiber and a manufacturing method thereof, and an optical transmission system.

BACKGROUND ART

Following an increase of computer and internet use in late years, a demand for information transmission is rapidly increased and a transmission system having high transmission capacity is required. In June of 2002, 10 Gigabit Ethernet (registered trademark) is standardized as IEEE (registered trademark) 802.3ae. Accordingly, commercialization of information transmission devices and information transmission medium constituting the transmission system having high transmission capacity is anticipated, and information transmission device venders and information transmission medium makers consider the improvement of the transmission capacity of the information transmission devices and the information transmission medium.

Owing to this situation, use of conventional metal cables is shifting to use of optical fiber cables as the information transmission medium. The optical fiber cable treating optical signal can perform super-long distance data communication because of lower signal attenuation than the metal cable treating electric signal. In addition, since shielding from leak of the optical signal is easier than leak of the electric signal, a large number of the optical fiber cables can be bundled without mutual interference.

As types of the optical fiber cables, there are silica glass optical fiber cables and plastic optical fiber cables and so on. Especially, the plastic optical fiber cable can be easily manufactured and processed with low cost compared to the silica glass optical fiber cable.

The plastic optical fiber cable has a plastic optical fiber (POF) as a light guide path. The POF includes a core for transmitting light and an outer shell provided around the core for keeping the light inside the core. The light entering to the core passes through the POF while repeating total reflection at the interface between the core and the outer shell having different refractive indices. Recently, a graded-index POF (GI-POF), in which the refractive index gradually increases toward the center of the core in radial direction, has gotten a lot of attention. In the GI-POF, light through the center and light entering the periphery are transmitted in approximately same time by its specific refractive index distribution (profile). Therefore, distortion does not occur in an input signal, which realizes large capacity of transmission and high-speed communication.

As a production method for the POF, there is a method in which a preform of the POF is formed and then heat-drawn to be the POF having a desired diameter. In Japanese Patent Laid-open Publication 10-96825 (by the inventor of the present invention), in a preform producing process, a polymerizable composition is poured into a pipe and the polymerizable composition is polymerized in the rotating pipe is rotated, to form a polymer layer inside the pipe. Above processes are repeated to form a preform having a plurality of polymer layers concentrically stacked. Since the polymerizable composition for each layer having a corresponding refractive index different from for other layers is used, a GI-POF having a desired refractive index distribution can be manufactured.

Meanwhile, as another solution for increasing the information transmission capacity of the transmission device, wavelength-division multiplexing (WDM), dense wavelength division multiplexing (DWDM) or the like are proposed. These methods are utilizing an optical property that light beams of different wavelengths do not interfere in each other. Since the optical signals having different wavelengths are transmitted at the same time in the optical fiber, the information transmission capacity in the optical fiber can be drastically increased.

However, the transmission system utilizing WDM or DWDM is now used only in few specific areas, because transmission devices for this system require high cost. Accordingly, to provide a transmission system having a superior transmission property with low cost, a POF having superior transmission property is needed. However, a manufacturing method for a POF having a high-bandwidth property of 10 Gbps, and a refractive index distribution for the POF serves to give the high-bandwidth property of 10 Gbps are still not disclosed.

An object of the present invention is to provide a POF having a superior transmission property and a manufacturing method thereof. Further, another object of the present invention is to provide an optical transmission system using such POF.

DISCLOSURE OF INVENTION

To accomplish the above objects and other objects, a plastic optical fiber of the present invention comprises a core for transmitting light and an outer shell provided around the core for keeping the light inside the core. The core includes a copolymer of a first polymerizable compound shown as following Formula (1) and a second polymerizable compound shown as following Formula (2). The core has a refractive index distribution satisfying following Equations (1) and (2) when the center of a cross-sectional circle of the core 65 has a refractive index of N1, an outermost part of the core has a refractive index of N2, a radius of the core is shown as R1 and a refractive index distribution coefficient is shown as g:

$$N(r)=N1[1-2\Delta(r/R1)^g]^{1/2} \qquad \text{[Equation (1)]}$$

$$\Delta=(N1^2-N2^2)/(2N1^2) \qquad \text{[Equation (2)]}$$

[Formula (1)]

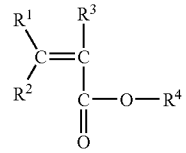

wherein $R^1$ and $R^2$ each independently represent H or D; $R^3$ represents H, D, $CH_3$, $CD_3$ or a halogen atom; $R^4$ represents an alkyl group having from 2 to 8 carbon atoms and at least one hydrogen atom substituted with a fluorine atom. Preferably, $R^1$ and $R^2$ are D. Preferably $R^3$ is H, D, $CH_3$, $CD_3$, or a fluorine atom or a chlorine atom, more preferably $CD_3$, or a fluorine atom or a chlorine atom, even more preferably $CD_3$. Preferably, $R^4$ is a fluorine-substituted alkyl group having from 2 to 6 carbon atoms, more preferably a fluorine-substituted alkyl group having from 2 to 4 carbon atoms. The fluorine-substituted alkyl group may be branched or cyclic, but is preferably linear. Preferably, the C—H bond existing in the fluorine-substituted alkyl group is partly or wholly substituted with a C-D bond. Specifically, formula (1) preferably has a deuterated fluoroalkyl methacrylate, in which the deuteration degree is preferably from 95% to less than 100%.

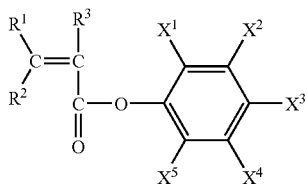

[Formula (2)]

wherein $R^1$ and $R^2$ each independently represent H or D; $R^3$ represents H, D, $CH_3$, $CD_3$ or a halogen atom; $X^1$ to $X^5$ each independently represent H, D, a halogen atom or $CF_3$, and at least one of $X^1$ to $X^5$ is a halogen atom or $CF_3$. Preferably, $R^1$ and $R^2$ are D. Preferably, $R^3$ is H, D, $CH_3$, $CD_3$, or a fluorine atom or a chlorine atom, more preferably $CD_3$. Preferably, $X^1$ to $X^5$ each are independently a fluorine atom, a chlorine atom or $CF_3$, more preferably a fluorine atom or a chlorine atom. In formula (2), the number of the halogen atoms (especially preferably fluorine atoms) on the phenyl group is preferably at least 2, most preferably at least 3. Specifically, formula (2) preferably has a deuterated halogenophenyl methacrylate, in which the deuteration degree is preferably from 95% to less than 100%.

It is preferable that the refractive index distribution coefficient g satisfies following Equation (3):

$$2 \leq g \leq 2.3 \quad \text{[Equation (3)]}$$

It is preferable that the core has a constant outer diameter of in a range of 60 μm to 250 μm. It is preferable that when the plastic optical fiber is bent at a curvature radius of 10 mm and bending angle of 360°, an increase amount of transmission loss is less than 1.0 dB. In addition, it is preferable that a value of the transmission loss is in a range of 20 dB/km to 200 dB/km.

An optical transmission system of the present invention comprises the plastic optical fiber, a light transmitter and a light receiver. The light transmitter includes a modulator connected to one end of the plastic optical fiber for generating modulation signal of 10 Gbps, and a light source of 850 nm wavelength for outputting optical signal based on the modulation signal. The light receiver includes a light detector for detecting the optical signal and outputting the modulation signal based on the optical signal, and a demodulator for performing demodulation of the modulation signal. It is preferable that the plastic optical fiber has a length of in a range of 0.03 m to 50 m.

In the present invention, a manufacturing method for a plastic optical fiber comprises steps listed below. At first, a polymerizable composition is poured in a hollow portion of a pipe, the polymerizable composition includes a third polymerizable compound shown as following Formula (3) and a fourth polymerizable compound shown as following Formula (4). Next, the polymerizable composition is polymerized while rotating the pipe around the center of a cross-section circle as a rotational axis, to form a polymer layer inside an inner wall of the pipe. The pouring step and the polymerizing step are additionally performed one after the other while a ratio of the fourth polymerizable compound toward the third polymerizable compound is gradually increased, to form a core preform in which a plurality of the polymer layers are concentrically stacked inside the pipe. In addition, an outer shell preform having a hole is formed. The outer shell preform is formed of a polymer whose refractive index is no more than that of the core preform. Then a fiber preform is formed by inserting the core preform into the hole of the outer shell preform. Finally, the fiber preform is heat-drawn to form a plastic optical fiber comprising a core for transmitting light and an outer shell provided around the core for keeping the light inside the core. The core has a refractive index distribution satisfying following Equations (4) and (5) when the center of a cross-sectional circle of the core 65 has a refractive index of N1, an outermost part of the core has a refractive index of N2, a radius of the core is shown as R1 and a refractive index distribution coefficient is shown as g:

$$N(r)=N1[1-2\Delta(r/R1)^g]^{1/2} \quad \text{[Equation (4)]}$$

$$\Delta=(N1^2-N2^2)/(2N1^2) \quad \text{[Equation (5)]}$$

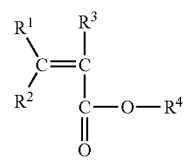

[Formula (3)]

wherein $R^1$ and $R^2$ each independently represent H or D; $R^3$ represents H, D, $CH_3$, $CD_3$ or a halogen atom; $R^4$ represents an alkyl group having from 2 to 8 carbon atoms and at least one hydrogen atom substituted with a fluorine atom. Preferably, $R^1$ and $R^2$ are D. Preferably $R^3$ is H, D, $CH_3$, $CD_3$, or a fluorine atom or a chlorine atom, more preferably $CD_3$, or a fluorine atom or a chlorine atom, even more preferably $CD_3$. Preferably, $R^4$ is a fluorine-substituted alkyl group having from 2 to 6 carbon atoms, more preferably a fluorine-substituted alkyl group having from 2 to 4 carbon atoms. The fluorine-substituted alkyl group may be branched or cyclic, but is preferably linear. Preferably, the C—H bond existing in the fluorine-substituted alkyl group is partly or wholly substituted with a C-D bond. Specifically, formula (3) preferably has a deuterated fluoroalkyl methacrylate, in which the deuteration degree is preferably from 95% to less than 100%.

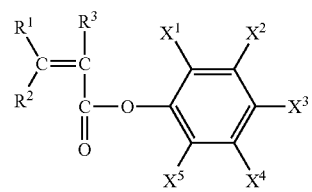

[Formula (4)]

wherein $R^1$ and $R^2$ each independently represent H or D; $R^3$ represents H, D, $CH_3$, $CD_3$ or a halogen atom; $X^1$ to $X^5$ each independently represent H, D, a halogen atom or $CF_3$, and at least one of $X^1$ to $X^5$ is a halogen atom or $CF_3$. Preferably, $R^1$ and $R^2$ are D. Preferably, $R^3$ is H, D, $CH_3$, $CD_3$, or a fluorine atom or a chlorine atom, more preferably $CD_3$. Preferably, $X^1$ to $X^5$ each are independently a fluorine atom, a chlorine atom or $CF_3$, more preferably a fluorine atom or a chlorine atom. In formula (4), the number of the halogen atoms (especially preferably fluorine atoms) on the phenyl group is preferably at least 2, most preferably at least 3. Specifically, formula (4)

preferably has a deuterated halogenophenyl methacrylate, in which the deuteration degree is preferably from 95% to less than 100%.

It is preferable that the refractive index distribution coefficient g satisfies following Equation (6):

$$2 \leq g \leq 2.3 \qquad \text{[Equation (6)]}$$

According to the plastic optical fiber of the present invention, since the core includes the copolymer of the first polymerizable compound shown as Formula (1) and the second polymerizable compound shown as Formula (2), the core has the refractive index distribution satisfying Equations (1) and (2) when the center of the cross-sectional circle of the core 65 has the refractive index of N1, the outermost part of the core has the refractive index of N2, the radius of the core is shown as R1 and the refractive index distribution coefficient is shown as g, the plastic optical fiber can have both a low transmission loss and a high-bandwidth property.

Since the copolymer of the first polymerizable compound and the second polymerizable compound has a low wavelength dependency of the refractive index, a material dispersion of the core is reduced and the core can have a high optical transparency and maintain the low transmission loss even when absorbing moisture. Further, since the known heat-drawing process can be applied to the core of the above copolymer for producing the plastic optical fiber, the plastic optical fiber can be easily produced with low cost.

Since the refractive index of the first polymerizable compound shown as Formula (1) is different from that of the second polymerizable compound shown as Formula (2), copolymers having different refractive indices can be obtained by changing compositional ratio in copolymerization of the two. Accordingly, by sequentially forming plural copolymer layers having different refractive indices in the polymerization process, the refractive index distribution satisfying the equations (1) and (2) can be applied to the core preform.

By applying the refractive index distribution which satisfies Equations (1) to (3) to the above core, the plastic optical fiber having the reduced mode dispersion and material dispersion can be made. Because of a high-bandwidth property of such GI-type plastic optical fiber, data transmission of 10 Gbps can be performed in single wavelength (850 nm) of the light source. In view of the bandwidth property, the value of g in Equation (3) is more preferably in a range of 2.05 to 2.25, and most preferably in a range of 2.1 to 2.2.

When the outer diameter of the core is too small, an axial misalignment between an optical transmission device and the plastic optical fiber possibly occurs in connection of them. The axial misalignment leads to decrease of the transmission property. On the other hand, when the outer diameter of the core is too large, an optical coupling efficiency at a light receiving section of the optical transmission device, where the plastic optical fiber is connected, is decreased. In consideration of these problems, the outer diameter of the core is preferably in a range of 60 μm to 250 μm, particularly in a range of 100 μm to 220 μm, and especially in a range of 120 μm to 220 μm.

Since the increase amount of transmission loss is less than 1.0 dB when the plastic optical fiber is bent at the curvature radius of 10 mm and the bending angle of 360°, deterioration of the transmission property of the plastic optical fiber, which is caused by bending it for wiring or the like, can be prevented.

When the transmission loss of the core is over 200 dB/km, the maximum transmission distance for the incident light becomes short. On the other hand, when the transmission loss of the core is less than 20 dB/km, the incident conditions (for example mode noise of the light source and so on) are directly passing through inside the core, which causes deterioration of the transmission property of the plastic optical fiber. In consideration of above problems, the transmission loss is preferably in a range of 20 dB/km to 200 dB/km, particularly in a range of 20 dB/km to 150 dB/km, especially in a range of 20 dB/km to 100 dB/km.

According to the optical transmission system of the present invention, the optical transmission system can have a high bandwidth of 10 Gbps with low cost. In addition, when the light transmitter and the light receiver utilizes wavelength-division multiplexing (WDM), dense wavelength division multiplexing (DWDM) or the like, the optical transmission system can have higher bandwidth property.

When the length of the plastic optical fiber is too long, the effect of the mode dispersion and the transmission loss is increased. Accordingly, there may be a case that the plastic optical fiber cannot maintain the high-bandwidth property of 10 Gbps. On the other hand, when the length of the plastic optical fiber is too short, the light passing through the core possibly becomes noisy because of a short distance between the light source and the light detector. In consideration of above problems, the length of the plastic optical fiber is preferably in a range of 0.03 m to 50 m, particularly in a range of 0.2 m to 50 m, especially in a range of 5 m to 20 m.

According to the manufacturing method for a plastic optical fiber, since the polymerizable composition including the third polymerizable compound shown as Formula (3) and the fourth polymerizable compound shown as Formula (4) is poured in the hollow portion of the pipe, the polymerizable composition is polymerized while rotating the pipe to form the polymer layer inside the inner wall of the pipe, the pouring step and the polymerizing step are additionally performed one after the other while the ratio of the fourth polymerizable compound toward the third polymerizable compound is gradually increased to form the core preform in which the plurality of the polymer layers are concentrically stacked inside the pipe, the outer shell preform having the hole and the refractive index no more than the core preform is formed, the fiber preform is formed by inserting the core preform into the hole of the outer shell preform, and the fiber preform is heat-drawn to form the plastic optical fiber comprising the core for transmitting light and the outer shell provided around the core for keeping the light inside the core, wherein the core has the refractive index distribution satisfying following Equations (4) and (5) when the center of the cross-sectional circle of the core 65 has the refractive index of N1, the outermost part of the core has the refractive index of N2, the radius of the core is shown as R1 and the refractive index distribution coefficient is shown as g, the plastic optical fiber having the high-bandwidth property can be manufactured.

Since the core is formed by copolymerization of the third polymerizable compound shown as Formula (3) and the fourth polymerizable compound shown as Formula (4), the plastic optical fiber having a superior bandwidth property can be manufactured. Further, the core of the copolymer of the third polymerizable compound and the fourth polymerizable compound can maintain the low transmission loss even when absorbing moisture and has a high optical transparency and no optical anisotropy, which serve to give the superior transmission property to the plastic optical fiber. Further, since the known heat-drawing process can be applied to the core of the above copolymer for manufacturing the plastic optical fiber, the plastic optical fiber can be easily manufactured with low cost.

BEST MODE FOR CARRYING OUT THE INVENTION

Figure 1:
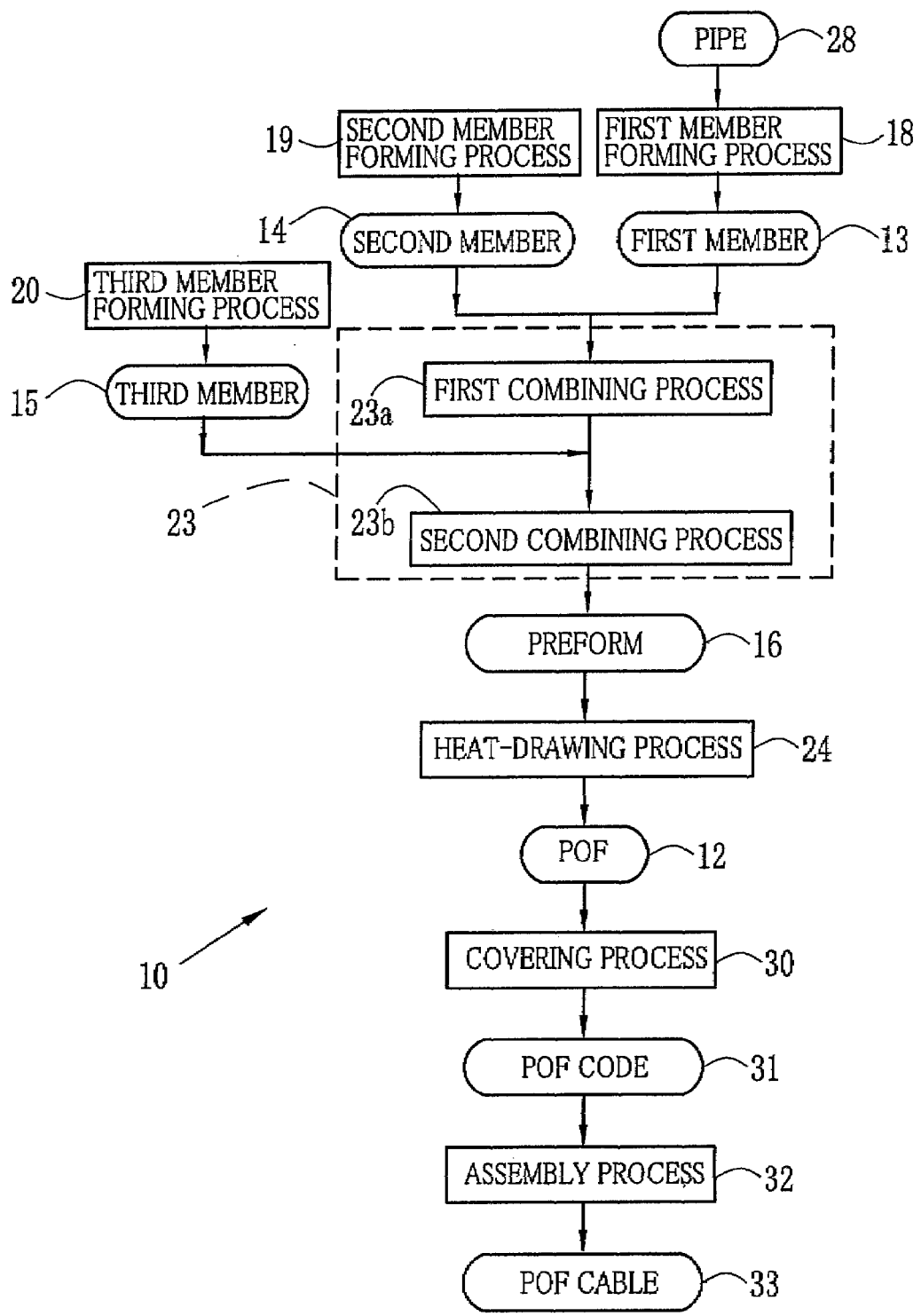
FIG. 1 is a process chart of a plastic optical fiber cable of the present invention.

The preferable embodiments of the present invention are hereinafter described with reference to figures, but these embodiments do not limit the present invention. At first, a POF (plastic optical fiber) cable forming process 10 will be explained with reference to FIG. 1.

A POF 12 is obtained by heat-drawing a preform 16 which is a combination of a first member 13, a second member 14 and a third member 15. The POF cable forming process 10 comprises a first member forming process 18 for forming the first member 13 having a refractive index distribution (profile), a second member forming process 19 for forming the cylindrical second member 14, a third member forming process 20 for forming the cylindrical third member 15, a combining process 23 for combining the first to third members 13 to 15 into the preform 16, and a heat-drawing process 24 for heat-drawing the preform 16 into the POF 12.

In the first member forming process 18, a polymerizable composition and additives are poured into a hollow part of a pipe 28, and the pipe 28 is rotated around the center of a cross-section circle as a rotational axis for polymerization (rotation polymerization method). By repeating the rotation polymerization method, first to nth layers (n is an integer at least three) are sequentially stacked from an internal surface toward center of the pipe 28. The first member forming process 18 is described in detail below.

In this embodiment, the first member 13 is a n-layers concentric structure removed from the pipe 28. However, the pipe 28 with n−1 layers inside may be the first member 13. In the first member forming process 18, a pouring amount of the polymerizable composition into the pipe 28 becomes smaller for forming the inner layer than for forming the outer layer. Accordingly, each layer can be adjusted to have a thickness same or close to other layers.

In the second member forming process 19 and the third member forming process 20, the second member 14 of a tetrafluoroethylene-hexafluoropropylene-vinylidene fluoride ternary copolymer (THV), and the third member 15 of a polymethyl methacrylate (PMMA) are respectively formed. Note that the forming method for the second and third members 14 and 15 is not limited, for example they may be formed from the polymer into the cylindrical shape by a commercial type melt-extrusion machine (extruder) or the like, or may be formed from polymerizable compound to be polymerized into the cylindrical shape. The materials of the second and third member 14 and 15 are described in detail later.

Next, in the combining process 23, the first to third members 13 to 15 are combined into the preform 16. At first, the first member 13 is inserted into a hollow part of the second member 14 (a first combining process 23a). Then the combined member formed at the first combining process 23a is inserted into a hollow part of the third member 15 (a second combining process 23b). Accordingly, the preform 16 is formed. Note that it may be also that at first the second member 14 and the third member 15 are combined and then the first member 13 is inserted into the combined member.

The preform 16 is drawn in the heat-drawing process 24 to be the POF 12 having a desired diameter. In the drawing process 24, the cylindrical preform 16 is heated and drawn in its longitudinal direction. Note that the preform 16 itself exhibits the function as the light transmission medium, before being drawn to be the POF 12.

In a covering process 30, the outer peripheral surface of the POF 12 is covered by covering material. In this process, it is general that the second covering is applied on the first covering on the POF 12. However, the number of covering layers is not limited in one or two. The POF 12 with applied the covering layer is called the POF code 31.

In an assembly process 32, the single or a bundle of plural POF codes 31 is cut into a desired length, and then a connector 33a (shown in FIG. 6) is attached to each end face of the single or the bundle of the POF codes 31 where a mirror polishing is applied. In these processes, a POF cable 33 is produced.

Figure 2:
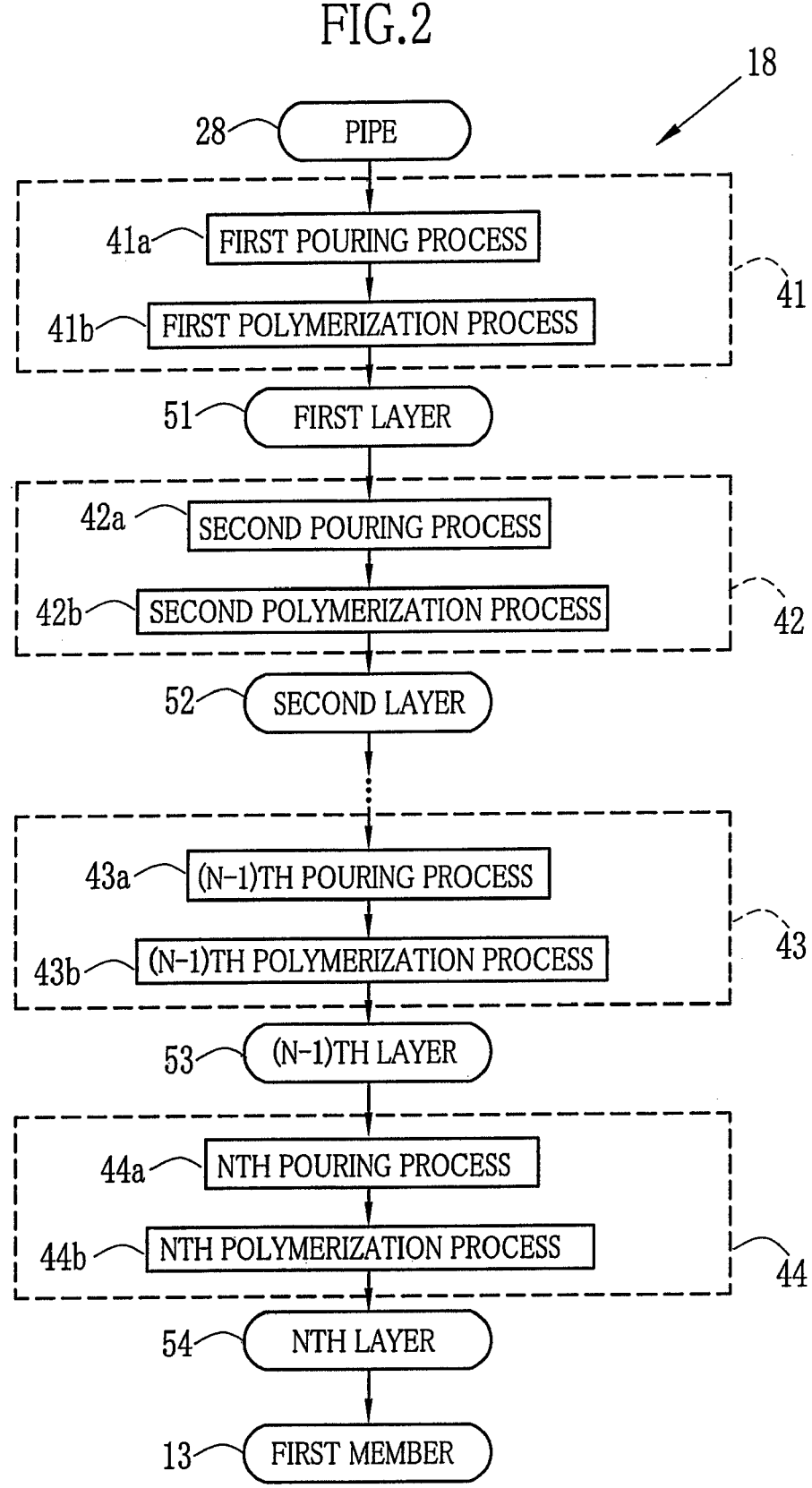
FIG. 2 is a process chart of a first member of the present invention.

Next, the first member forming process 18 is described in detail with reference to FIG. 2.

In a first layer forming process 41, a first polymerizable composition for the first layer 51 is poured into the pipe 28 (a first pouring process 41a). Then the first polymerizable composition is polymerized to be the cylindrical first layer 51 on an interior surface of the pipe 28 (a first polymerization process 41b). Next, in a second layer forming process 42, a second polymerizable composition is poured on the first layer 51 in the pipe 28 (a second pouring process 42a), and the second polymerizable composition is polymerized to be the cylindrical second layer 52 inside the first layer 51 (a second polymerization process 42b). Such layer forming process is continuously repeated until a desired number of layers are formed. To form the (n−1)th layer 53 which is just outside the innermost layer (the nth layer 54), in the same way as the first and second layers, a (n−1)th polymerizable composition is poured (a (n–1)th pouring process 43a) and the (n–1)th polymerizable composition is polymerized (a (n–1)th polymerization process 43b), in a (n–1)th layer forming process 43. Finally, a nth polymerizable composition is poured on the (n–1)th layer 53 in the pipe 28 (a nth pouring process 44a), and the nth polymerizable composition is polymerized to be the nth layer 54 (a nth polymerization process 44b), in a nth layer forming process 44. Accordingly, the first member 13 of the n-number of concentric layers is formed inside the pipe 28 (see FIG. 3). Note that in each polymerization process, a rotation polymerization method in which the pipe containing the polymerizable composition is rotated around the axis of the pipe to polymerize the polymerizable composition.

The first to nth polymerizable composition includes a first polymerizable compound and a second polymerizable compound. In this embodiment, the first polymerizable compound is a deuteriated 2,2,2-trifluoroethyl methacrylate (3FMd7) whose polymer has a refractive index of 1.41, and the second polymerizable compound is a deuteriated pentafluorophenyl methacrylate (PFPMAd5) whose polymer has a refractive index of 1.49. The first to nth polymerizable compositions have a mixing ratio of the 3FMd7 and the PFPMAd5 different from each others. The polymer of each polymerizable composition has a refractive index according to the mixing ratio. Accordingly, the first member 13, formed from the first to nth polymerization composition and additives, can have a desired refractive index distribution. The first to nth polymerizable composition, the first polymerizable compound and the second polymerizable compound are described in detail later.

Figure 3:
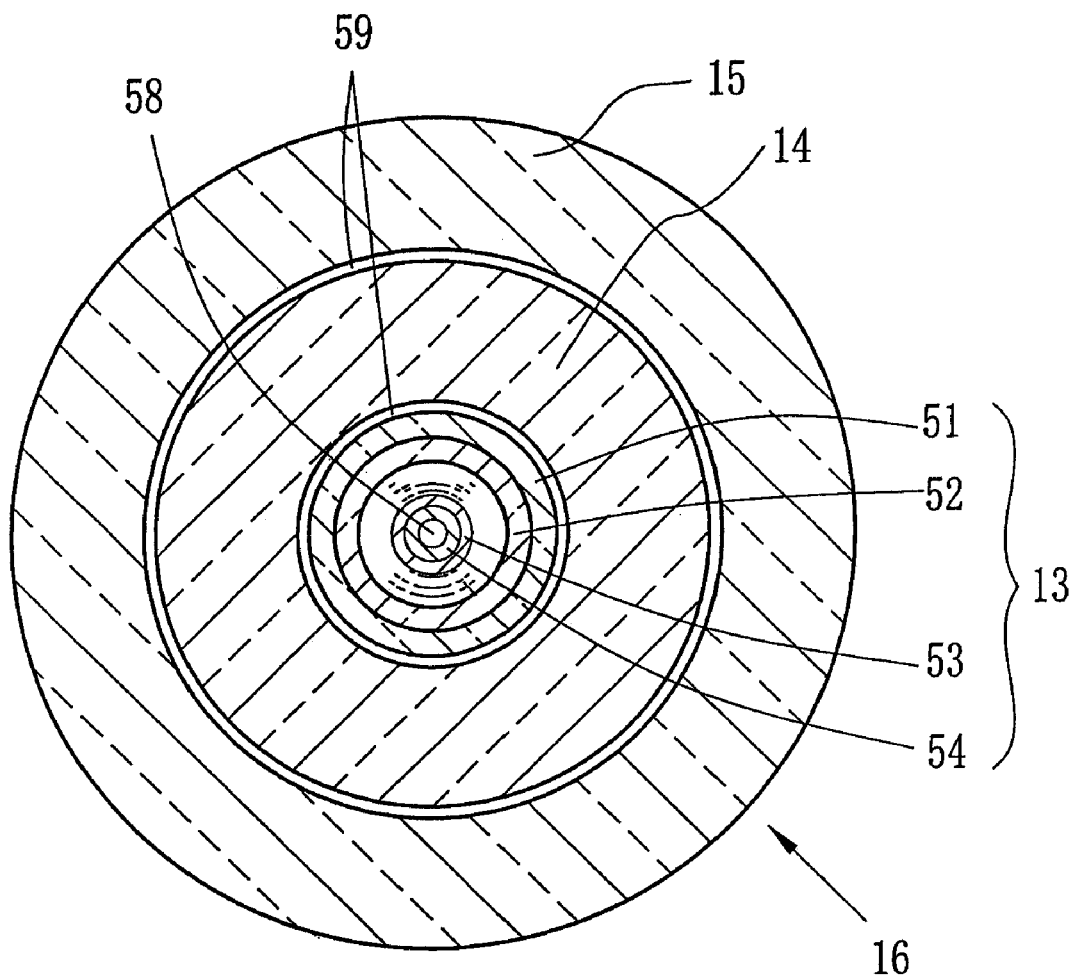
FIG. 3 is a cross-sectional view of a preform in radial direction.

Next, with reference to FIG. 3, the preform 16 obtained from the present invention will be explained. However, the present invention is not limited in this embodiment. As shown in FIG. 3, the preform 16 comprises the third member 15 as the outermost shell, the second member 14 provided inside the third member 15, and the first member 13 provided inside the second member 14. The first member 13 has multi-layer structure including the first layer 51 to the nth layer 54. In FIG. 3, there is a cavity 58 in the center of the preform 16. However, the existence or nonexistence of the cavity 58 and the ratio of diameter thereof to the outer diameter of the preform 16 are not limited and may be changed in accordance with the manufacturing conditions. Although the preform 16 in FIG. 3 clearly shows a border between each two of the layers 51 to 54 for convenience of the explanation, the border may be identified not clearly, because the clarity of the border is dependent on conditions of the production. For example, polymerizable compositions of the first layer 51 and the second layer 52 may be in contact and soaked through each other, which makes the border invisible. Note that in consideration of transmission of light, it is preferable that optically there is no border.

It is preferable that the first to third members 13 to 15 respectively has an outer diameter and an inner diameter such that clearances 59 are formed between each member when they are combined. Accordingly, the combining process 23 can be easily performed without damaging each member, which serves to make the POF 12 with excellent optical properties such as a low transmission loss by preventing divergence of light and the like.

Next, the POF 12 made by melt-drawing the preform 16 will be described with reference to FIG. 4. The cross-sectional shape of the POF 12 is similar to that of the preform 16. The POF 12 includes a core 65 which is a concentric n-layers structure having first to nth layers 61 to 64, an outer shell 66 around an outer periphery of the core 65, and an outermost shell 67 around an outer periphery of the outer shell 66.

An outer diameter D1 of the core 65 is preferably in a range of 60 μm to 250 μm, particularly in a range of 100 μm to 220 μm, especially in a range of 120 μm to 220 μm. When the POF 12 having the core 65 and the outer shell 66 is bent 360° at a curvature radius of 10 mm, an increase amount of transmission loss is less than 1.0 dB. Accordingly, deterioration of the transmission property of the POF, which is caused by bending the POF for wiring or the like, can be prevented.

Figure 4:
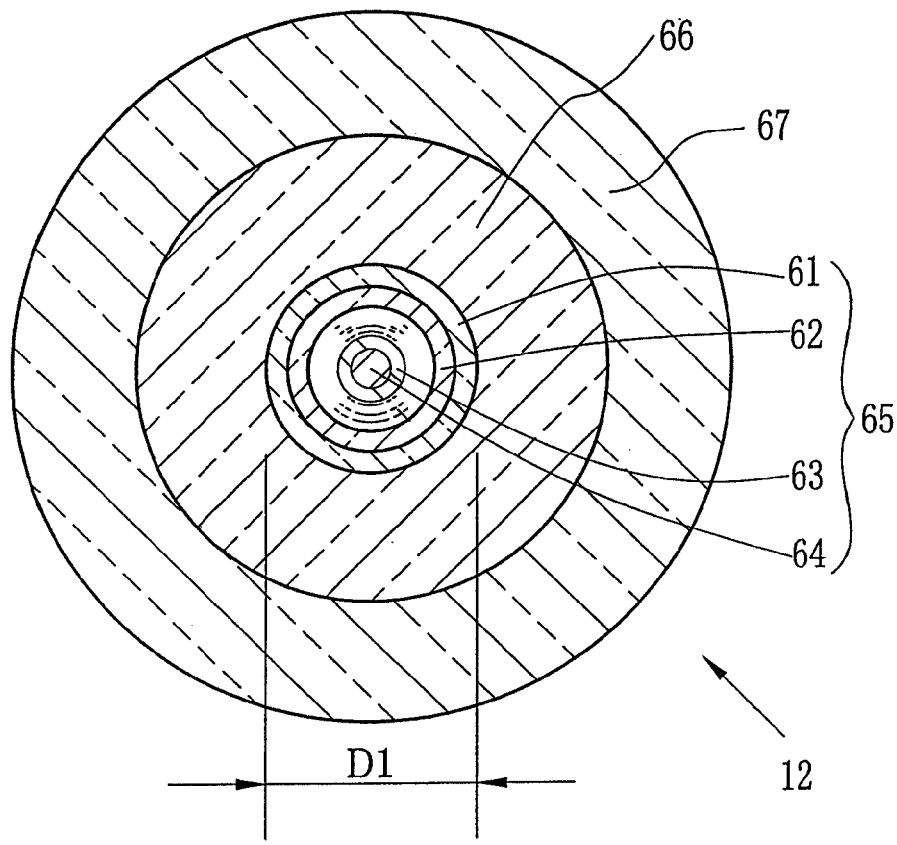
FIG. 4 is a cross-sectional view of a POF in radial direction.
Figure 5:
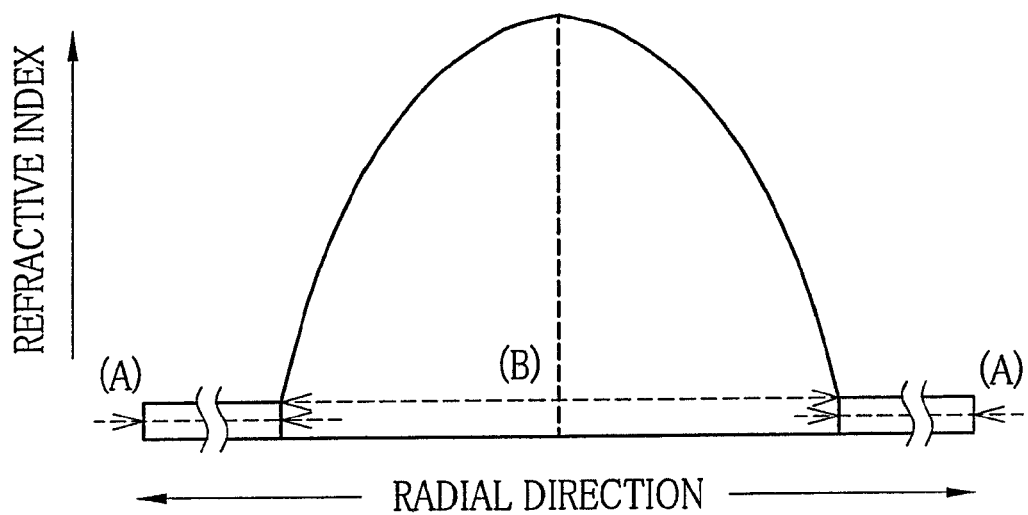
FIG. 5 is an explanatory view describing a refractive index distribution of the POF in radial direction.

FIG. 5 shows the refractive index distribution of the POF 12. In this figure, the horizontal axis indicates the radius direction of the POF 12, and the vertical axis indicates the refractive index. The refractive index increases as the line in the graph goes upward. The range (A) corresponds to the outer shell 66 (see FIG. 4) and the outermost shell 67 (see FIG. 4), and the range (B) corresponds to the core 65 (see FIG. 4).

As shown in FIG. 4, the first layer 61 is an outermost part of the core 65, and the second layer 62 is layered on an internal surface of the first layer 61. In this manner, the layers are stacked toward the center of the core 65, and a centermost layer of the core 65 is the nth layer 64. The refractive index is gradually increased from the first layer 61 to the nth layer 64. That is, the core 65 has a GI-type refractive index distribution (see FIG. 5).

The refractive index N (r) at a position, where a distance r apart in a radius direction from the center of the core 65 having a radius of R1, is satisfied following equations (1) to (3) when the center of a cross-sectional circle of the core 65 (r=0) has the refractive index of N1, the outermost part of the core 65 (r=R1) has the refractive index of N2, and a refractive index distribution coefficient is shown as g:

$$N(r)=N1[1-2\Delta(r/R1)^g]^{1/2} \qquad \text{[Equation (1)]}$$

$$\Delta=(N1^2-N2^2)/(2N1^2) \qquad \text{[Equation (2)]}$$

$$2 \leq g \leq 2.3 \qquad \text{[Equation (3)]}$$

A bandwidth property of the GI-type POF is mainly governed by a mode dispersion and a material dispersion. The mode dispersion is a phenomenon that two incident light beam entered into the core at different incident angles at the same time take a length of time different from each other for passing through the core. The material dispersion is a wavelength dependency of the refractive index of the POF 12. Therefore, to give the highest bandwidth property to the POF 12, the materials of the POF 12 need to be selected in consideration of the wavelength dependence of the refractive index, and the refractive index distribution coefficient g in Equation (1) needs to be selected according to the materials of the POF 12.

In the present embodiment, the core 65 is formed of the copolymer of 3FMd7 and PFPMAd5 which has a low wavelength dependency of the refractive index. By applying the refractive index distribution which satisfies Equations (1) and (2) to the core 65, the POF 12 which has the reduced mode dispersion and material dispersion and the high-bandwidth property can be made.

In addition, when the refractive index distribution of the core 65 satisfies Equation (3), the mode dispersion and material dispersion are more reduced. The combination of these effects significantly improves the bandwidth property of the POF 12. The refractive index distribution coefficient g is preferably in a range of 2.05 to 2.25, especially in a range of 2.1 to 2.2 (in this range the bandwidth property of the POF 12 is most improved). Concretely, the POF 12 having the core 65 described above exhibits the bandwidth property of 10 Gbps (at 850 nm of light source). The polymerizable composition for the core 65 is described in detail later.

Figure 6:
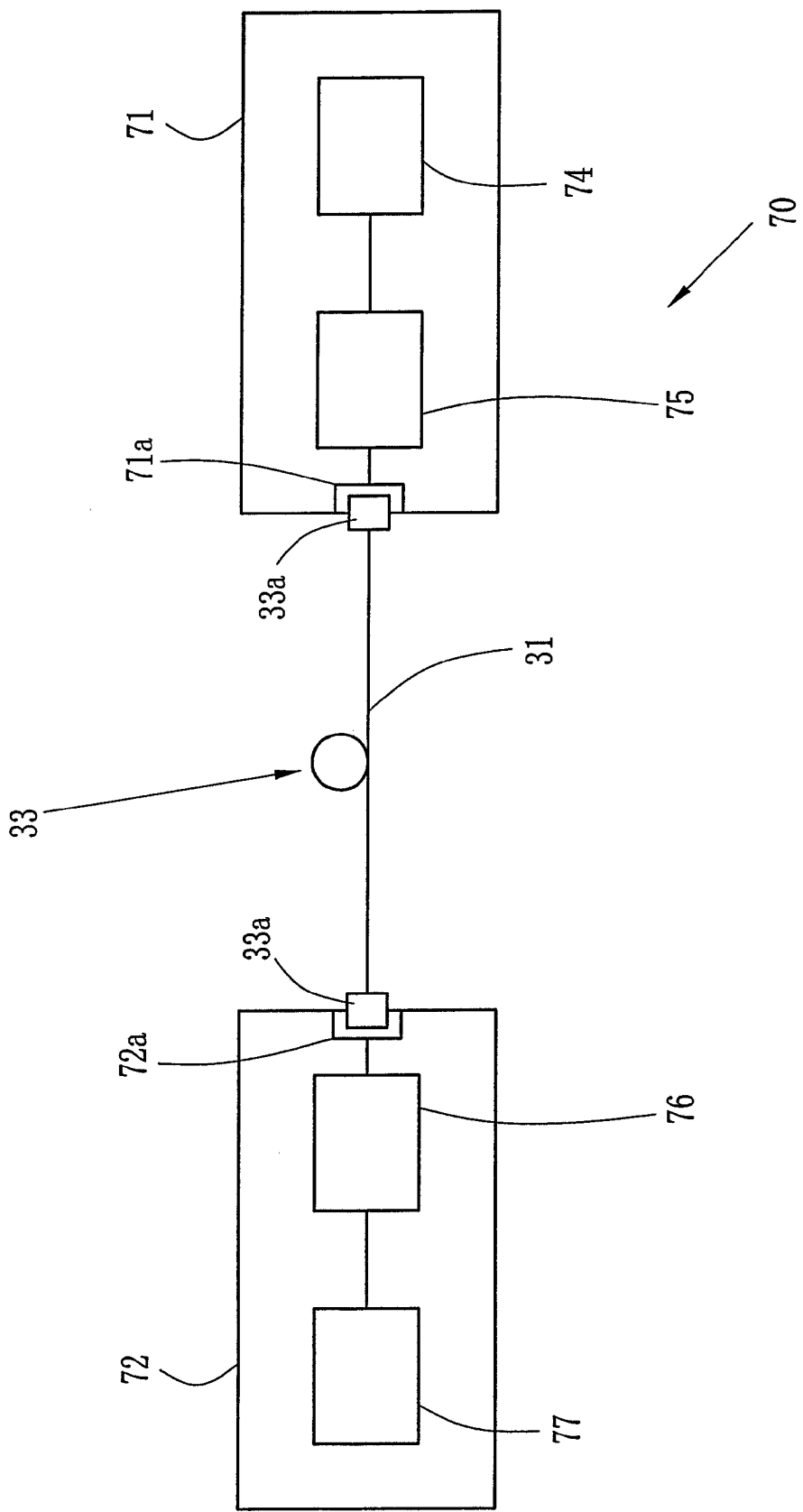
FIG. 6 is an explanatory view showing an outline of an optical transmission system of the present invention.

As shown in FIG. 6, an optical transmission system 70 comprises a light transmitter 71, a light receiver 72, and the POF cable 33 connected between the light transmitter 71 and the light receiver 72.

The light transmitter 71 includes a connector 71*a*, a modulator 74 for performing modulation, and a laser diode 75 as a light source of 850 nm wavelength. The connector 71*a* is provided on a casing of the light transmitter 71. The light transmitter 71 is connected to an information terminal such as a personal computer. A controlling section (not shown) converts data from the information terminal into a specific format, and outputs the converted data to the modulator 74. The modulator 74 modulates the data from the controlling section into electric modulation signal of 10 Gbps. Then the modulator 74 outputs the electric modulation signal to the laser diode 75. The laser diode 75 photoelectrically converts the electric modulation signal from the modulator 74 into optical modulation signal. Then the laser diode 75 outputs the optical modulation signal through the connector 71*a*. Note that as the laser diode 75, any known types with high-speed response can be used. For example, Vertical Cavity Surface Emitting Laser (VCSEL) is preferably used in consideration of high-speed response and beam divergence angle.

The light receiver 72 includes a connector 72*a*, a photodiode 76 as a light detector, and a demodulator 77 for performing demodulation of 10 Gbps. The connector 72*a* is provided on a casing of the light receiver 72. The photodiode 76 receives the optical modulation signal through the connector 72*a*. Then the photodiode 76 photoelectrically converts the optical modulation signal into the electric modulation signal and outputs the electric modulation signal to the demodulator 77. The demodulator 77 demodulates the electric modulation signal into the data. The demodulation method in the demodulator 77 is corresponding to the modulation method in the modulator 74. Then the demodulator 77 outputs the data to a controlling section (not shown). The controlling section converts the data into a format readable to an information terminal and outputs the converted data to the information terminal.

As the modulation method, the present embodiment uses a direct modulation method in which the output light from the laser diode 75 is turn on/off according to the electric modulation signal. However, the present invention is not limited to this. For example, it may be used an external modulation method, in which phase, amplitude, polarization and/or the like of the output light from the laser diode 75 are changed according to the electric modulation signal. In addition, any known method can be used as the modulation method for the modulator 74. For example, there are an analog modulation such as AM, FM and PM, a digital modulation such as ASK, PSK, FSK, QAM, DM, MSK, CCK and PCM, and a pulse modulation such as PWM, PAM, PDM and PPM.

The connectors 33*a* of the POF cable 33 are connected to the connectors 71*a* and 72*a*, so that the POF cable 33 transmits the optical modulation signal from the light transmitter 71 to the light receiver 72. Accordingly, the data communication between the light transmitter 71 and the light receiver 72 can be performed. This configuration of the optical transmission system 70 can have a high-bandwidth of 10 Gbps with low cost.

The POF 12 of the present invention has the high-bandwidth property of 10 Gbps for single wavelength. In addition, when wavelength-division multiplexing (WDM), dense wavelength division multiplexing (DWDM) or the like is used, the optical transmission system can have higher bandwidth property.

When the transmission loss in the core 65 is too large, the maximum transmission distance for the incident light becomes short. On the other hand, when the transmission loss in the core 65 is too small, the optical property of the incident light passing through the core 65 is considerably changed according to the incident conditions. In consideration of above problems, the transmission loss is preferably in a range of 20 dB/km to 200 dB/km, particularly in a range of 20 dB/km to 150 dB/km, especially in a range of 20 dB/km to 100 dB/km.

When the length of the POF cable 33 is too long, the effect of the mode dispersion and the transmission loss is increased. Accordingly, there may be a case that the POF cable 33 cannot maintain the high-bandwidth property of 10 Gbps. On the other hand, when the length of the POF cable 33 is too short, the light may pass through the core 65 with noise because of a short distance between the light source and the light detector. In consideration of above problems, the length of the POF cable 33 is preferably in a range of 0.03 m to 50 m, particularly in a range of 0.2 m to 50 m, especially in a range of 5 m to 20 m.

(First Member)

Next, materials for the first member 13, which is the preform of the core 65, are described. The first member 13 includes the first layer to the nth layer. Each of the first to nth layers includes the copolymer of each of the first to nth polymerizable compositions. The ratio of the second polymerizable compound toward the first polymerizable compound is gradually increased from the first polymerizable composition toward the nth polymerizable composition. The refractive index of homopolymer possibly generated from the second polymerizable compound is higher than that of homopolymer possibly generated from the first polymerizable compound. Accordingly, the refractive index of each of the layers formed at the polymerization processes 41*b* to 44*b* increases from the first layer 51 toward the nth layer 54. As described above, according to the first to nth layer forming processes 41 to 44, the first member 13 having the desired refractive index distribution can be formed.

The POF 12 formed of copolymerization of the first polymerizable compound and the second polymerizable compound can maintain the low transmission loss even when absorbing moisture. Further, the POF 12 has a high optical transparency and no optical anisotropy, which serve to give the superior transmission property to POF 12. In addition, the known heat-drawing process can be applied to produce the POF 12, the POF 12 can be easily produced with low cost.

A most preferable example of the first and second polymerizable compounds are deuteriated 2,2,2-trifluoroethyl methacrylate (3FMd7) whose homopolymer has a refractive index of 1.41, and deuteriated pentafluorophenyl methacrylate (PFPMAd5) whose homopolymer has a refractive index of 1.49. To form a desired refractive index distribution in the first member 13, these two kinds of polymerizable compounds are copolymerized at a corresponding compounding ratio for each layer of the first member 13. In this embodiment, 3FMd7 and PFPMAd5 in which a part of hydrogen atoms is substituted by deuterium atoms are used for forming each layer. The use of the deuteriated polymer for the light transmission section is preferable to reduce the transmission loss in the POF 12. Note that further information of the first polymerizable compound and the second polymerizable compound is described later.

It is preferable that the first and second polymerizable compounds whose homopolymers having different refractive indices are used for each layer in terms of affinity of layers and handling ability in manufacturing. However, three or more kinds of polymerizable compounds may be used in considering optical and/or mechanical property of the final product, or productivity. In this case, each polymerizable composition for each layer may have different kinds of contents and different compounding ratio from other polymerizable compositions. As described above, since polymerizable compounds whose homopolymers having different refractive indices are copolymerized at different compounding ratio, each of plural layers can have different refractive index.

In addition, since each layer is formed from the polymerizable composition including same polymerizable compounds as those in other polymerizable compositions for other layers, affinities of interfaces of two layers can be improved, and light scattering at the interfaces can be reduced. Note that an affinity between a hydrogenated compound and a deuteriated compound is same as affinities between the hydrogenated compounds and between the deuteriated compounds. Accordingly, the hydrogenated compound and the deuteriated compound can be treated as the same polymerizable composition. On the other hand, when the adjacent two layers are formed of different polymerizable compositions, it is difficult to improve the affinity of the interface of the two layers, which increases the transmission loss because of the light scattering.

To apply the refractive index distribution to the first member 13, in addition to the above-described method, there is a method that a refractive index controlling agent is added to the polymerizable composition for each of the layers 51 to 54 at different amount. In this method, the amount of the refractive index controlling agent increases from the layer positioned at the periphery of the core toward the layer positioned at the center of the core. Accordingly, the core whose refractive index is increased from the periphery toward the center is formed.

(Polymerizable Composition)

Next, the first to nth polymerizable composition is described in detail. As the first to nth polymerizable composition, preferably polymerizable compositions which become amorphous polymers when polymerized are used. In a copolymer formed from the amorphous polymers, the light scattering is rarely occurred. In addition, layers formed from the amorphous polymers have a high adhesiveness to each other. More preferably, the polymer having superior mechanical property and durability to heat and moisture is used.

In this embodiment, 3FMd7 and PFPMAd5 are used as the polymerizable compounds for the first to nth polymerizable composition. However, any kind of mixture of a first polymerizable and a second polymerizable compound may be used, as long as the first polymerizable compound generates a homopolymer and the second polymerizable compound generates a homopolymer whose refractive index is different from the homopolymer from the first polymerizable compound. Next, the first and second polymerizable compounds are described in detail. In this specification, "H" represents a hydrogen atom, and "D" represents a deuterium atom unless otherwise noted. In addition, the word "polymerize" sometimes means "copolymerize" in the present invention unless otherwise noted.

Each of the first to nth polymerizable composition is a mixture of the first polymerizable compound shown in Formula (1), the second polymerizable compound shown in Formula (2), and additives such as a polymerization initiator.

[Formula (1)]

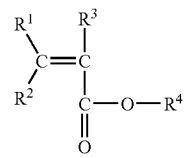

wherein $R^1$ and $R^2$ each independently represent H or D; $R^3$ represents H, D, $CH_3$, $CD_3$ or a halogen atom; $R^4$ represents an alkyl group having from 2 to 8 carbon atoms and at least one hydrogen atom being substituted with a fluorine atom. Preferably, $R^1$ and $R^2$ are D. Preferably $R^3$ is H, D, $CH_3$, $CD_3$, or a fluorine atom or a chlorine atom, more preferably $CD_3$, or a fluorine atom or a chlorine atom, even more preferably $CD_3$. Preferably, $R^4$ is a fluorine-substituted alkyl group having from 2 to 6 carbon atoms, more preferably a fluorine-substituted alkyl group having from 2 to 4 carbon atoms. The fluorine-substituted alkyl group may be branched or cyclic, but is preferably linear. Preferably, the C—H bond existing in the fluorine-substituted alkyl group is partly or wholly substituted with a C-D bond. Specifically, formula (1) preferably has a deuterated fluoroalkyl methacrylate, in which the deuteration degree is preferably from 95% to less than 100%.

[Formula (2)]

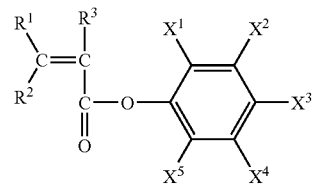

wherein $R^1$ and $R^2$ each independently represent H or D; $R^3$ represents H, D, $CH_3$, $CD_3$ or a halogen atom; $X^1$ to $X^5$ each independently represent H, D, a halogen atom or $CF_3$, and at least one of $X^1$ to $X^5$ is a halogen atom or $CF_3$. Preferably, $R^1$ and $R^2$ are D. Preferably, $R^3$ is H, D, $CH_3$, $CD_3$, or a fluorine atom or a chlorine atom, more preferably $CD_3$. Preferably, $X^1$ to $X^5$ each are independently a fluorine atom, a chlorine atom or $CF_3$, more preferably a fluorine atom or a chlorine atom. In formula (2), the number of the halogen atoms (especially preferably fluorine atoms) on the phenyl group is preferably at least 2, most preferably at least 3. Specifically, formula (2) preferably has a deuterated halogenophenyl methacrylate, in which the deuteration degree is preferably from 95% to less than 100%.

Specific examples of the compounds of formula (1) are mentioned below. Needless-to-say, the invention should not be limited to these compounds.

FA-1

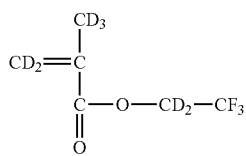

FA-2
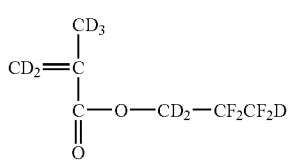
FA-3
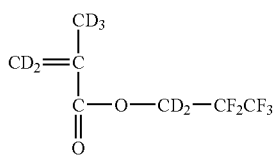
FA-4
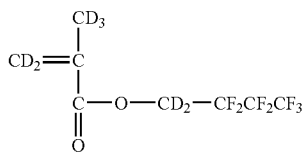
FA-5
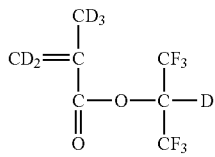
FA-6
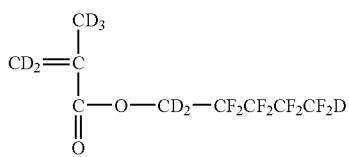
FA-7
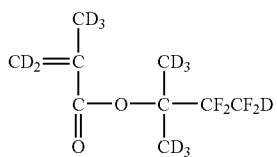
FA-8
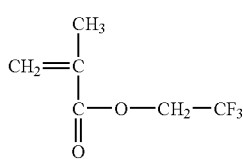
FA-9
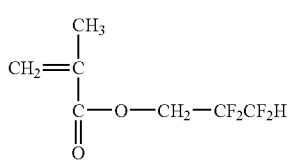
FA-10
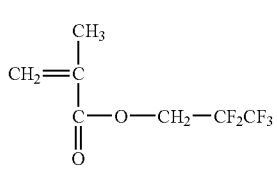
FA-11
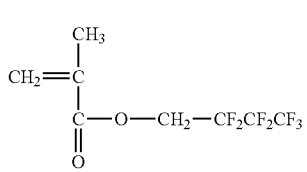
FA-12
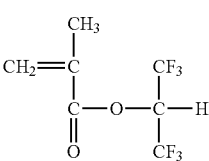
FA-13
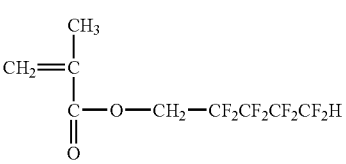
FA-14
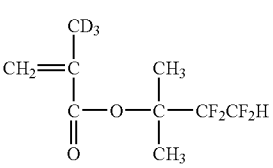
FA-15
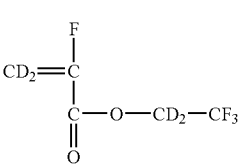
FA-16
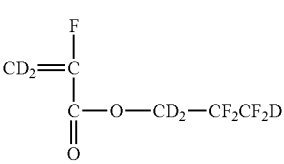
FA-17
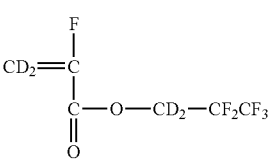
FA-18
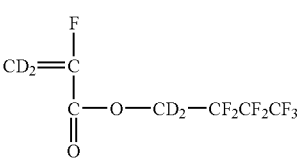
FA-19
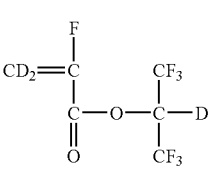
FA-20
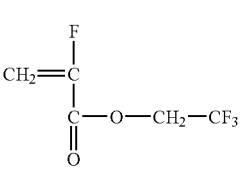
FA-21
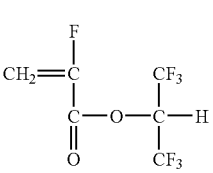

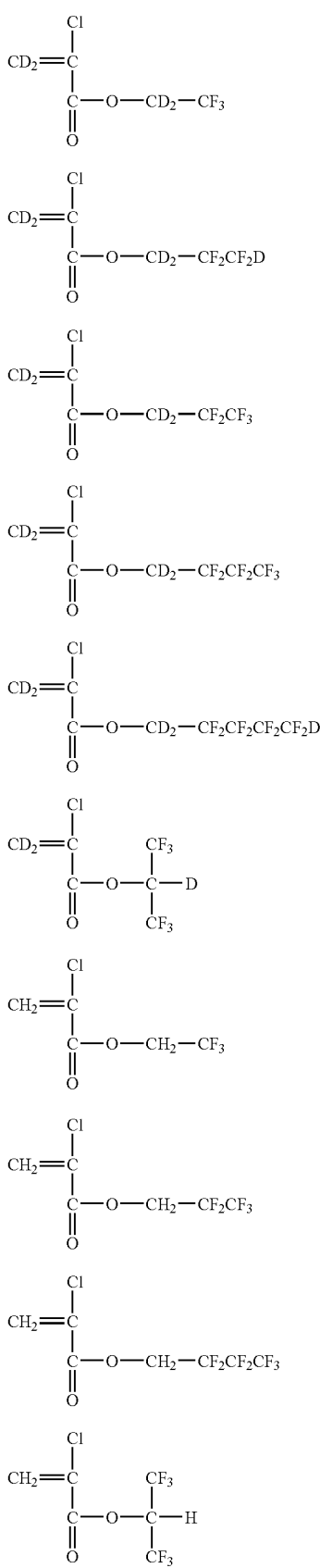
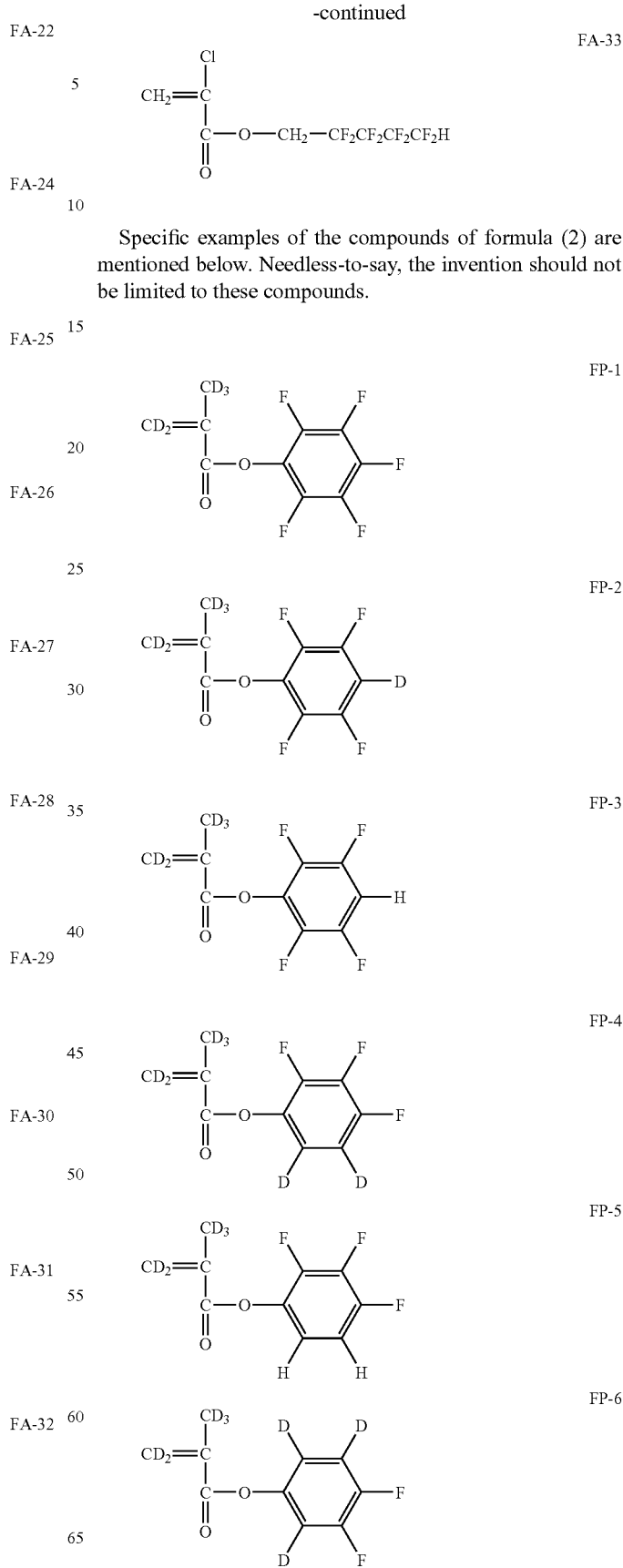
Specific examples of the compounds of formula (2) are mentioned below. Needless-to-say, the invention should not be limited to these compounds.

-continued
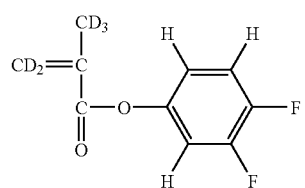 FP-7
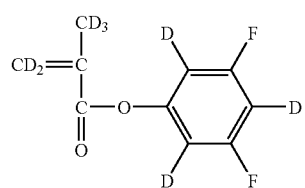 FP-8
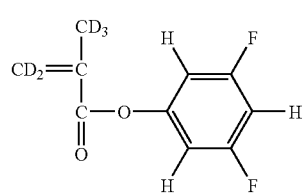 FP-9
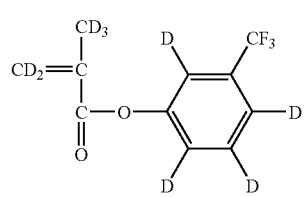 FP-10
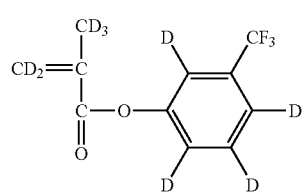 FP-11
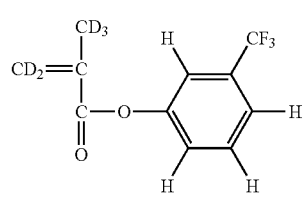 FP-12
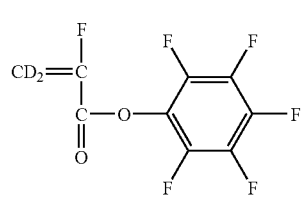 FP-13
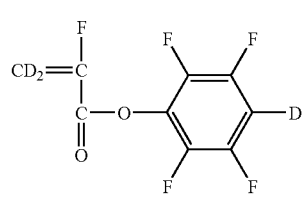 FP-14
-continued
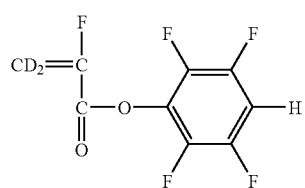 FP-15
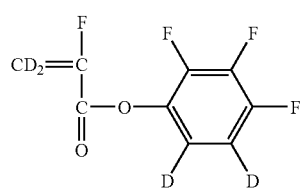 FP-16
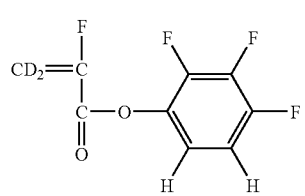 FP-17
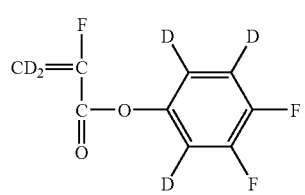 FP-18
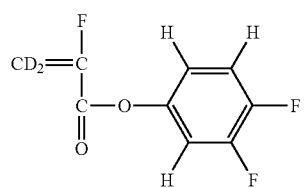 FP-19
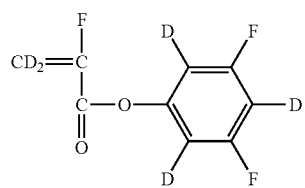 FP-20
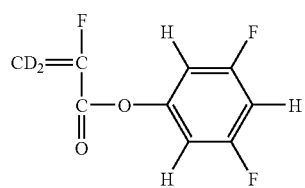 FP-21
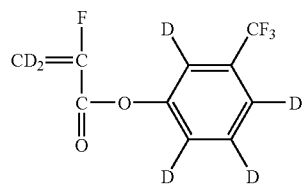 FP-22

-continued

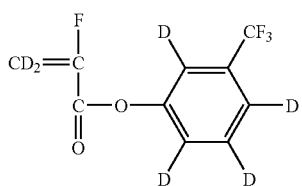 FP-23

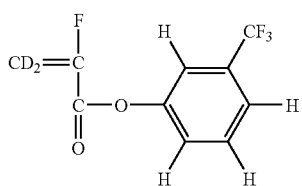 FP-24

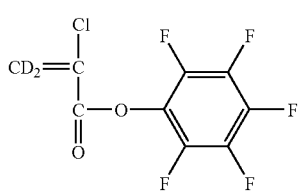 FP-25

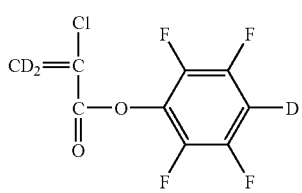 FP-26

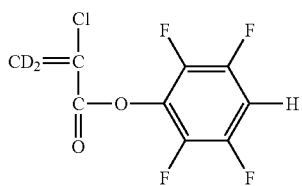 FP-27

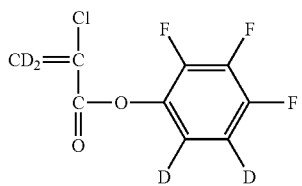 FP-28

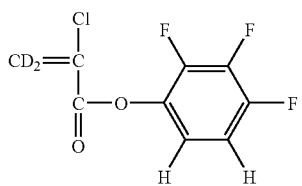 FP-29

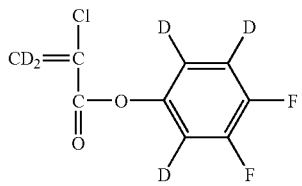 FP-30

-continued

FP-31

FP-32

FP-33

FP-34

FP-35

The refractive index of the homopolymer of the first polymerizable compound of formula (1) differs from that of the homopolymer of the second polymerizable compound of formula (2). Therefore, varying the compositional ratio in copolymerization of the first polymerizable compound of formula (1) and the second polymerizable compound of formula (2) gives copolymers having a varying refractive index. Concretely, for example, a homopolymer of FA-I has a refractive index of 1.42; and a homopolymer of FP-I has a refractive index of 1.50. Gradually varying the compositional ratio in copolymerization of the two may give an optical resin having a refractive index profile.

When heat and/or light is applied to the polymerizable composition, then the fluorine-containing polymerizable monomers in the composition begin to polymerize owing to the action of the radical generated by the polymerization initiator therein. Since the polymerizable composition in the invention comprises a fluorine-substituted compound as the chain transfer agent therein, the compound, if any, remaining in the polymer (fluorine-containing matrix) may reduce the transmission loss through the optical device formed of the polymer and therefore may improve the light transmittability of the optical member. Further, when the compositional ratio of the first polymerizable compound of formula (1) to the second polymerizable compound of formula (2) in the polymerizable composition is gradually varied, then the composition may form a refractive index profile optical member that has a refractive index profile readily introduced thereinto. The polymerization speed and the degree of polymerization of the polymerizable monomers in the composition may be controlled by the polymerization initiator and the chain transfer agent therein and the polymer produced may have a desired molecular weight. Therefore, for example, when the polymer obtained is stretched and drawn into an optical fiber, then it may be so designed as to have desired mechanical properties suitable for stretching it by controlling the molecular weight thereof. This contributes toward improving the polymer productivity.

For example, the polymerizable compounds used for forming the first to nth layers are (meta)acrylic ester containing fluorine. To select the polymerizable contents for each layer, the relations of the refractive index, affinity and so on between them for adjacent layers are preferably considered.

Examples of (meth)acrylic ester with fluorine are 2,2,2-trifluoroethyl methacrylate; 2,2,3,3-tetrafluoro propyl methacrylate; 2,2,3,3,3-pentafluoro propyl methacrylate; 1-trifluoromethyl-2,2,2-trifluoroethyl methacrylate; 2,2,3,3,4,4,5,5-octafluoropentyl methacrylate; 2,2,3,3,4,4,-hexafluorobutyl methacrylate, and the like. Although the present invention is not limited to the above kinds of the polymerizable compounds, it is preferable that the kinds and relative proportions of the polymerizable compositions are selected such that the copolymer from the polymerizable compositions has a desired refractive index distribution in the light transmission medium formed therefrom.

As to the preferred polymerizable compounds for each layer, besides the first and second polymerizable compounds, there is copolymer of methylmethacrylate (MMA) and fluoro (meth)acrylate, for example. As fluoro(meth)acrylate, there are trifluoroethyl methacrylate (3FM), hexafluoro isopropyl methacrylate and so forth, for example. Moreover, there is copolymer of MMA and alicyclic (meth)acrylate. As alicyclic (meth)acrylate, there are (meth)acrylate such as tert-butyl methacrylate having branch structure, isobornyl methacrylate, norbornyl methacrylate, tricyclodecanyl methacrylate and so forth. Further, it is possible to use polycarbonate (PC), norbornene-based polymer (for example, ZEONEX (registered trademark: produced by ZEON corporation)), functional norbornene-based polymer (for example, ARTON (registered trademark: produced by JSR)), fluoropolymer (for example, polytetrafluoroethylene (PTFE), polyvinylidene fluoride (PVDF) and so forth). Furthermore, it is possible to use copolymer of fluorine resin (for example, PVDF-based copolymer), tetrafluoroethylene-perfluoro alkylvinyl ether (PFA) random copolymer, chlorotrifluoroethylene (CTFE) copolymer, and so forth. In order to use the POF 12 for the near-infrared rays transmission, polymers such as described in Japanese Patent No. 3332922 and Japanese Patent Laid-Open Publication No. 2003-192708 are utilized. In this polymer, deuterium atom, fluorine and so forth are substituted for the hydrogen atom of a C—H bond, since absorption loss is caused by the C—H bond. By using this kind of the polymer, the wavelength region causing the transmission loss is shifted to the longer-wavelength side, and it is possible to reduce the loss of the transmission signal light. With respect to this kind of the polymer, for instance, there are deuteriated polymethylmethacrylate (PMMA-d8), polytrifluoroethylmethacrylate (P3FMA), and polyhexafluoro isopropyl-2-fluoroacrylate (HFIP2-FA). However, when these additional contents are increased too much, the transmission performance and the productivity of the POF are degraded and the effect of the present invention is disappeared. Accordingly, it is preferable that the amount of the additional contents is minimized, more preferable that these additional contents are not added. Incidentally, it is desirable that the impurities and foreign materials in the raw compound that causes dispersion should be sufficiently removed before polymerization so as to keep the transparency of the POF after polymerization.

(Additives)

In the present invention, additives are added to the first to nth polymerizable composition, and each of the first to nth polymerizable composition is copolymerized to the copolymer. As the additives, there are a polymerization initiator, a chain transfer agent and so on.

(Polymerization Initiator)

As to the polymerization initiators, there are various kinds to generate radicals. For example, there are benzoil peroxide (BPO); and peroxide compound [such as tert-butylperoxy-2-ethylhexanate (PBO); di-tert-butylperoxide (PBD); tert-butylperoxyisopropylcarbonate (PBI); n-butyl-4,4-bis(tert-butylperoxy)valarate (PHV), and the like]. Other examples of the polymerization initiators are azo compounds, such as 2,2'-azobisisobutylonitril; 2,2'-azobis(2-methylbutylonitril); 1,1'-azobis(cyclohexane-1-carbonitryl), and the like.

In addition to the above-described polymerization initiators, azo compounds without nitrile group can be used as the polymerization initiator, as described in Japanese Patent Laid-open Publications No. 2003-192714 and No. 2003-246813. Although the azo compounds is preferable as the polymerization initiator for (meta) acrylic ester monomer, the azo compounds with nitrile group is considerably colored by heat and cannot satisfy the optical transmission performance required to the optical member such as the optical fiber. Especially, the problem becomes the worst when used with mercaptans as the chain transfer agent. As the azo compounds without nitrile group, a compound shown in Formula (5) is preferable.

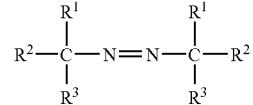

[Formula (5)]

wherein $R^1$, $R^2$ and $R^3$ each independently represent an alkyl group having from 1 to 6 carbon atoms, a cycloalkyl group having from 3 to 6 carbon atoms, —$COOR^4$, and —$CONR^5R^6$; $R^4$ represents an alkyl group having from 1 to 5 carbon atoms; $R^5$ and $R^6$ each independently represent an alkyl group having from 1 to 9 carbon atoms, a cycloalkyl group having from 3 to 6 carbon atoms. $R^5$ and $R^6$ may be combined to be a ring. The alkyl group of $R^1$ to $R^6$ may be may be linear or branched. As the alkyl group of $R^1$ to $R^6$, there are a methyl group, an ethyl group, an n-propyl group, a tert-butyl group, an n-pentyl group, an neopentyl group and so on. In these alkyl groups, preferably the methyl group, the tert-butyl group, the n-pentyl group and the neopentyl group, more preferably the methyl group, the tert-butyl group and the neopentyl group are used. As the cycloalkyl group of $R^1$ to $R^3$, $R^5$ and $R^6$, preferably a cyclohexyl group is used.

As concrete examples of the compound shown in Formula (5), there are azo compounds such as 2,2'-azobis(2-methylpropane);

2,2'-azobis(2-methylbutane); 2,2'-azobis(2-methylpentane);

2,2'-azobis(2,3-dimethylbutane); 2,2'-azobis(2-methylhexane);

2,2'-azobis(2,4-dimethylpentane);

2,2'-azobis(2,3,3-trimethylbutane);
2,2'-azobis(2,4,4-trimethylpentane);
3,3'-azobis(3-methylpentane); 3,3'-azobis(3-methylhexane);
3,3'-azobis(3,4-dimethylpentane);
3,3'-azobis(3-ethylpentane);
dimethyl-2,2'-azobis(2-methylpropionate);
diethyl-2,2'-azobis(2-methylpropionate);
di-tert-butyl-2,2'-azobis(2-methylpropionate), and the like.

Note that the polymerization initiators are not limited to the above substances. More than one kind of the polymerization initiators may be combined.

(Chain Transfer Agent)

In order to keep the physical properties, such as mechanical properties, thermal properties and so forth of the copolymer, over the whole plastic optical fiber to be manufactured, it is preferable to control the polymerization degree by use of the chain transfer agent. The kind and the amount of the chain transfer agent are selected in accordance with the kinds of the polymerizable monomer. The chain transfer coefficient of the chain transfer agent to the respective monomer is described, for example, in "Polymer Handbook, $3^{rd}$ edition", (edited by J. BRANDRUP & E. H. IMMERGUT, issued from JOHN WILEY&SON). In addition, the chain transfer coefficient may be calculated through the experiments in the method described in "Experiment Method of Polymers" (edited by Takayuki Ohtsu and Masayoshi Kinoshita, issued from Kagakudojin, 1972).

Preferable examples of the chain transfer agent are alkylmercaptans [for instance, n-butylmercaptan; n-pentylmercaptan; n-octylmercaptan; n-laurylmercaptan; tert-dodecylmercaptan, and the like], and thiophenols [for example, thiophenol; m-bromothiophenol; p-bromothiophenol; m-toluenethiol; p-toluenethiol, and the like]. It is especially preferable to use n-octylmercaptan, n-laurylmercaptan, and tert-dodecylmercaptan in the alkylmercaptans. Further, the hydrogen atom on C—H bond may be substituted by the fluorine atom (F) or a deuterium atom (D) in the chain transfer agent. Note that the chain transfer agents are not limited to the above substances. More than one kind of the chain transfer agents may be combined.

The chain transfer agent applicable to the present invention is not limited above. Preferably, the fluorine-substituted mercaptan has a fluorine content of at least 50% by mass, more preferably at least 60% by mass. The fluorine-substituted mercaptan is preferably at least one compound of the following formulae (6) and (7).

[Formula (6)]

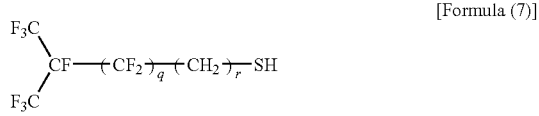

[Formula (7)]

wherein A represents H, D or a fluorine atom; p, q and r are integers that satisfy 15>p>r≧0 and 15>q>r≧0. Satisfying these, p is preferably an integer of from 1 to 15, more preferably from 2 to 12; q is preferably an integer of from 1 to 15, more preferably from 2 to 12; and r is preferably an integer of from 0 to 4, more preferably 0 to 2.

Examples of the compounds of formulae (6) and (7) are mentioned below. Two or more different types of the chain transfer agents may be used herein, as combined.

 (1-1)

 (1-2)

 (1-3)

 (1-4)

 (1-5)

 (1-6)

 (1-7)

 (1-8)

 (1-9)

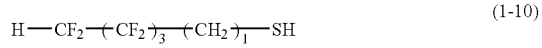 (1-10)

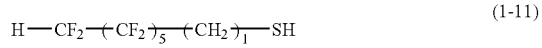 (1-11)

 (2-1)

 (2-2)

 (2-3)

 (2-4)

 (2-5)

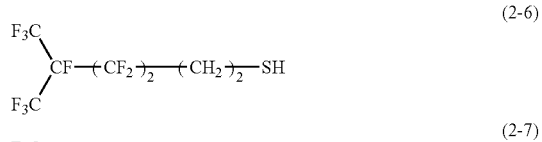 (2-6)

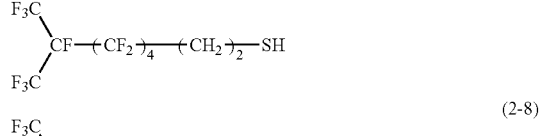 (2-7)

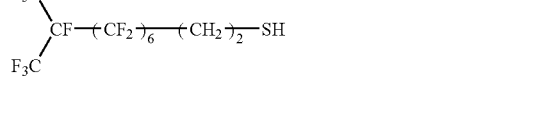 (2-8)

With respect to adding quantity of the polymerization initiator and the chain transfer agent, it is possible to properly determine a preferable range in accordance with the kind and so forth of the polymerizable composition to be used for the first to nth layers. In this embodiment, the polymerization initiator is added so as to be 0.005 to 0.5 mol % relative to the polymerizable composition to be used for the first to nth layers. It is much preferable to set this additive ratio within a range of 0.010 to 0.1 mol %. Meanwhile, the chain transfer agent is added so as to be 0.005 to 0.5 mol % relative to the polymerizable composition to be used for the first to nth layers. It is much preferable to set this additive ratio within a range of 0.01 to 0.1 mol %.

(Refractive Index Controlling Agent)

To apply the desired refractive index distribution, the refractive index controlling agent which is a nonpolymerizable compound can be added as the additive. By using the refractive index controlling agent, the refractive index distribution coefficient g can be easily controlled in the desired range. The refractive index controlling agent is preferably added 0.01 wt. % to 25 wt. % of each of the first to nth polymerizable composition, more preferably added 1 wt. % to 20 wt. %.

The refractive index controlling agent is preferably a low-molecular compound which has a high refractive index and a large molecule volume, does not involve the polymerization, and diffuses at a certain speed in the molten polymer. Note that the refractive index controlling agent is not limited to the monomer, and may be an oligomer (including a dimmer, a trimer and so on).

In addition, as the refractive index controlling agent, for example there are nonpolymerizable low-molecular compounds such as benzyl benzoate (BEN), diphenyl sulfide (DPS), triphenyl phosphite (TPP), benzyl-n-butyl phthalate (BBP), diphenyl phthalate (DPP), diphenyl (DP), diphenylmethane (DPM), tricresyl phosphate (TCP), diphenyl sulfoxide (DPSO); more preferred are BEN, DPS, TPP, DPSO. Since the refractive index controlling agent is added to the polymers for the first to third members 13 to 15 and a concentration distribution of the refractive index controlling agent is controlled, the refractive index of each member can be controlled at the desired value.

(Other Additives)

Other additives may be contained in each of the layers in the core so far as the transmittance properties do not decrease. For example, the additives may be used for increasing resistance of climate and durability.

Further, induced emissive functional compounds may be added for amplifying the optical signal. When such compounds are added to the monomer, attenuated signal light is amplified by excitation light so that the transmission distance increases. Therefore, the optical member with such additive may be used as an optical fiber amplifier in an optical transmission link. These additives may be contained in the layers in the core or a part thereof by polymerizing the additives with the various polymerizable compositions being as the raw material.

(Second Member and Third Member)

The second member 14 which is a preform of the outer shell 66, and the third member 15 which is a preform of the outermost shell 67 may be respectively formed of a polymerizable composition, which generates a polymer or a monomer whose refractive index is no more than the first member 13. Although these members can have a refractive index same as the first layer 51, the second member 14 preferably has a refractive index no more than the first layer 51. In experiments described later, the second member 14 has a refractive index no more than the first layer 51 and no less than the third member 15. However, the refractive index is not limited above, as long as the core 65 can surely transmit light. In this embodiment, since the refractive index is decreased from the center toward the periphery of the first member 13, and the refractive index of the second member 14 is no more than the first member 13, the third member 15 does not relate to the transmission of the light. Accordingly, the refractive index of the third member 15 is not limited. The refractive index of the second and third members 14 and 15 can be controlled by changing the mixing ratio of at least two different materials, or addition of the refractive index controlling agent described above, as same as for the first member 13.

The material for the second member 14 preferably has superior toughness and durability to heat and moisture. As concrete examples, there are a homopolymer and a copolymer of a fluorine-containing monomer. The fluorine-containing monomer is preferably a tetrafluoroethylene-hexafluoropropylene-vinylidene fluoride ternary copolymer (THV). However, the second member 14 may be formed of also a polyvinylidene fluoride (PVDF), a tetrafluoroethylene-hexafluoropylene copolymer (FEP), tetrafluoroethylene perfluoro alkylvinyl ether (PFA) or the like.

The material for the third member 15 preferably has superior toughness. As a concrete example, there is a methacrylate polymer (such as PMMA). The third member 15 of the polymethacrylate gives the superior toughness to the POF 12, therefore productivity and handling property of the POF 12 are improved. Further, the increase of transmission loss in the POF 12, due to a deformation by bending or external pressure, is prevented. In addition, the PMMA has a superior transparency. Although the third member 15 is provided in this embodiment for above reasons, the POF may be formed by heat-drawing a preform including only the first and second members 13 and 14.

(Rotation Polymerization Method)

Figure 7:
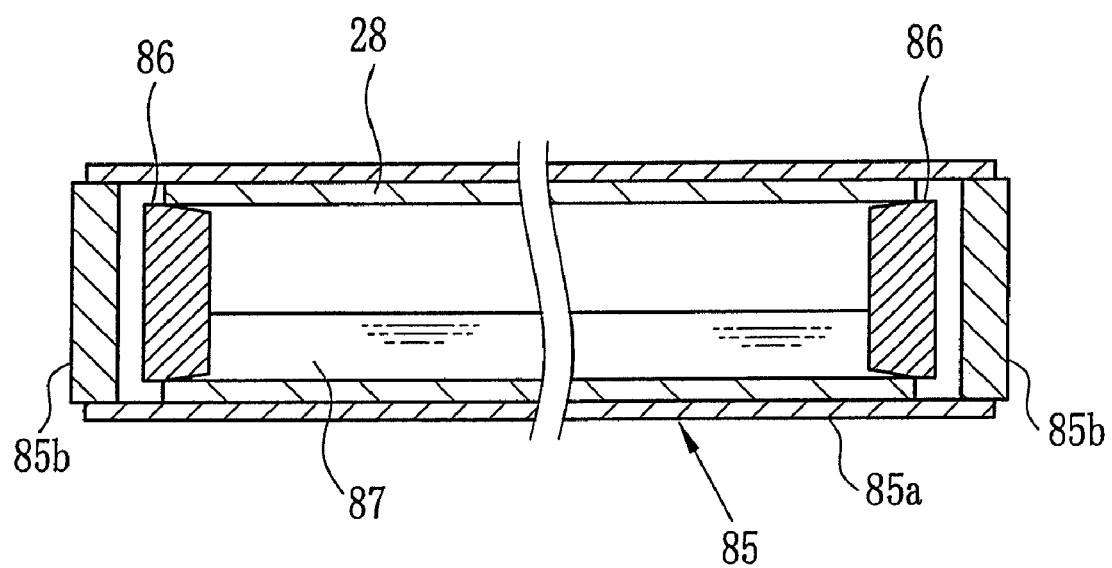
FIG. 7 is a cross-sectional view showing an outline of a polymerization container for rotation polymerization.

The rotation polymerization method is described with reference to FIGS. 7 to 10. The present embodiment does not limit the scope of the present invention, and is an example of the present invention. As shown in FIG. 7, a polymerization container 85 comprises a cylindrical container body 85a and a pair of lids 85b for sealing both ends of the container body 85a. The container body 85a and the lids 85b are made of SUS. The inner diameter of the polymerization container 85 is slightly larger than the outer diameter of the pipe 28 contained therein, and the rotation of the pipe 28 is synchronized with the rotation of the polymerization container 85.

At first, the pipe 28 formed by the commercial type melt-extrusion machine or the like is contained in the polymerization container 85. One end of the pipe 28 is sealed with a plug 86 formed from a material that is not dissolved by the polymerizable compounds for the first to nth layers. An example of the material of the plug 86 is polytetrafluoroethylene (PTFE). The plug 86 does not contain the compound that flows out a plasticizer.

After sealing the end of the pipe 86, a first polymerizable composition 87 for the first layer 51 is poured in the hollow portion of the pipe 28. The other end of the pipe is sealed with the plug 86, and then the first layer 51 is formed by polymerization of the first polymerizable composition 87 while rotation of the polymerization container 85. In order to ensure to rotate the pipe 28 together with the polymerization container 85, a support member or the like may be provided in the inner wall of the polymerization container 85.

Figure 8:
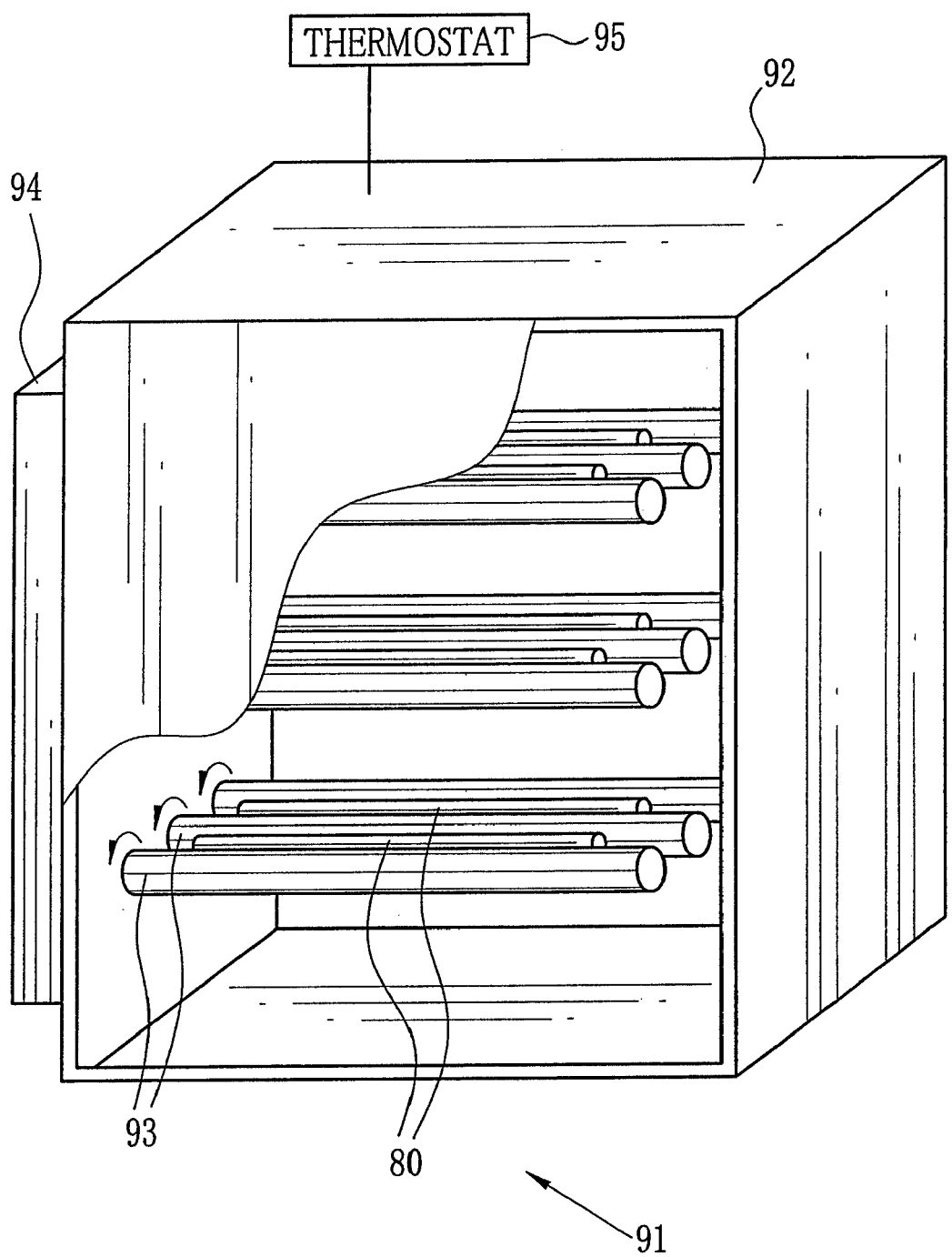
FIG. 8 is a perspective view of an outline of a rotation polymerization apparatus.

For rotating the polymerization container 85 as described above, a rotation polymerization device 91 is used. As shown in FIG. 8, the rotation polymerization device 91 comprises plural rotation members 93, a driver section 94 and a thermostat 95. The rotation members 93 are in a housing 92, and the driver section 94 and the thermostat 95 are provided outside of the housing 92. The thermostat 95 measures the temperature in the housing 92, and controls this temperature based on the measured result.

The cylindrical rotation members 93 are arranged in parallel such that the polymerization container 85 is supported by adjacent two rotation members 93. One end of the rotation member 93 is rotatably supported by the inner wall of the housing 92, and independently driven by the driver section 94. The driver section 94 has a controller (not illustrated) for controlling the operation of the driver section 94.

Figure 9:
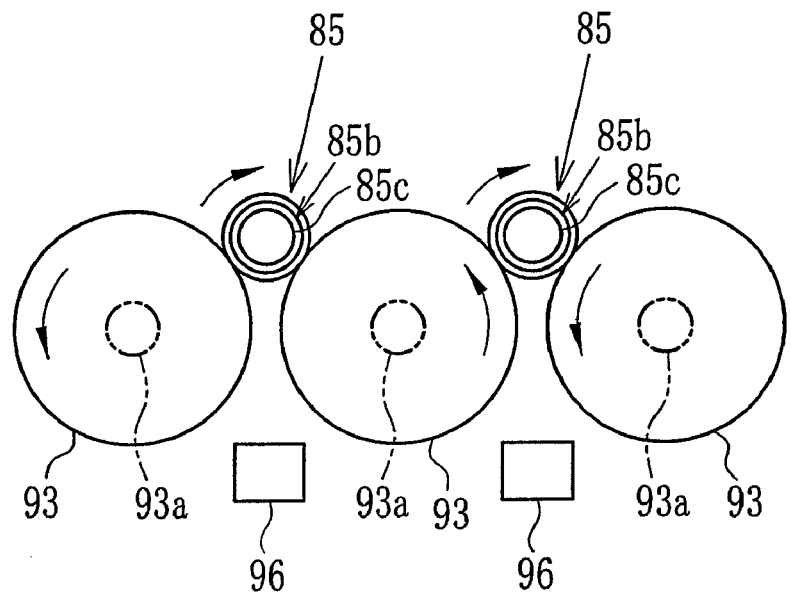
FIG. 9 is an explanatory view describing the rotation of the polymerization chamber in the rotation polymerization apparatus.

In the polymerization, the polymerization container 85 is held in the space between the surfaces of the adjacent rotation members 93, and rotated in accordance with the rotation of the rotation members 93 around the rotational axis 93a, as shown in FIG. 9. Since the polymerization container 85 is set and rotated in the rotation polymerization device 91, the first polymerizable composition 87 is polymerized. The method to rotate the polymerization container 85 is not limited to the surface drive type described in this embodiment.

As shown in FIG. 9, the polymerization container 85 is kept from moving upward during the rotation because of a magnet 85c provided in the lid 85b and a magnet 96 provided below the adjacent rotation members 93. In addition, upper rotation members may be provided above the polymerization container 85, and the upper rotation members may be rotated together with the rotation members 93 to prevent the polymerization container 85 from moving upward. It is also possible to provide holding means above the polymerization container 85 to apply certain weight to the polymerization container 85, but the method to hold the polymerization container 85 does not limit the scope of the present invention.

Before the rotation polymerization, the first layer material may be subject to preliminary polymerization in which the pipe 28 is kept substantially vertically. In the preliminary polymerization, a rotation mechanism may be provided to rotate the pipe 28 around the cylinder axis, if necessary. The rotation polymerization can form the first layer 51 on the whole inner surface of the pipe 28 because the longitudinal axis of the pipe 28 is kept horizontal. In forming the first layer 51, although it is preferable that the longitudinal axis of the pipe 28 is kept horizontal in order to form the first layer 51 on the whole inner surface of the pipe 28, the longitudinal axis of the pipe 28 may be kept roughly horizontal. The permissive angle of the vertical axis of the pipe 28 is about 5° to the ground.

The first to nth polymerizable compositions are preferably used after removing inhibitor, moisture, impurities and so forth, by filtering and distillation. In addition, it is preferable that the mixture of the monomer and the polymerization initiator is subject to ultrasonic wave process to remove dissolved gas and volatile component. The pipe 28 and the first polymerizable composition 87 may be subject to decompression process by use of a known decompression apparatus just before or/and after forming the first layer 51, if necessary.

The pipe 28 having the first layer 51 is taken out of the rotation polymerization device 91, and then the pipe 28 is subject to heating process by use of a heating machine such as the thermostatic oven at a predetermined temperature.

Figure 10:
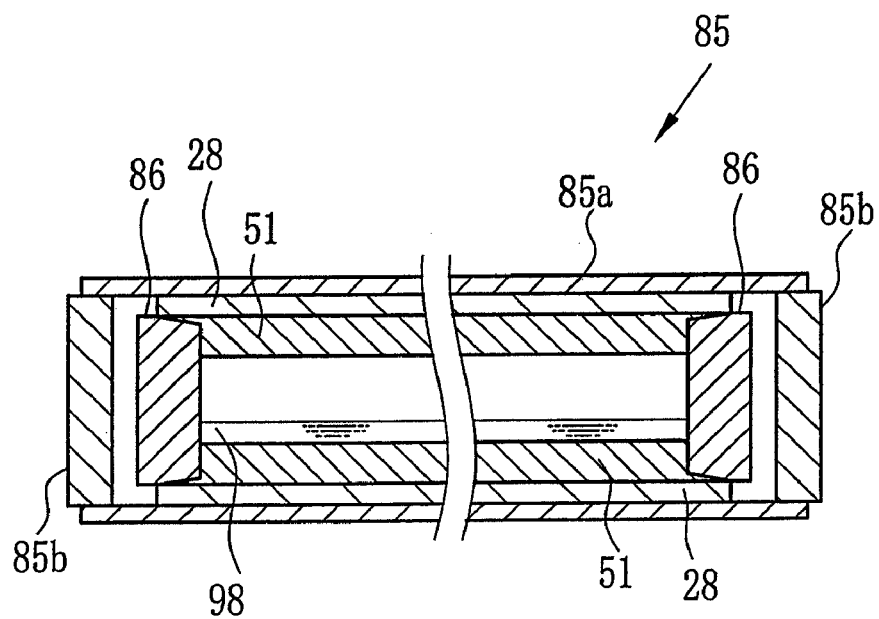
FIG. 10 is a perspective view of an outline of the rotation polymerization apparatus after formation of the first layer.

The second to nth layers 52 to 54 are formed sequentially by polymerization. Referring to FIG. 10 showing the polymerization container 85 used in formation of the first layer 51, the second polymerizable composition 98 is poured in the hollow part of the first layer 51. Then the pipe 28 is set in the polymerization container 85 with both edges thereof being sealed by the plugs 86, such that the longitudinal axis of the pipe 28 is kept horizontal. While the pipe 28 is rotated around the cylinder axis thereof, the second polymerizable composition is polymerized to form the second layer 52. Polymerization of the second to nth polymerizable compositions is carried out by use of the rotation polymerization device 91 (see FIG. 8) used for formation of the first layer 51. The pipe 28 and the second to nth polymerizable compositions may be subject to decompression process by use of a known decompression device just before or/and after pouring the second to nth polymerizable compositions, if necessary.

When the second polymerizable composition 98 starts polymerization, the second polymerizable composition 98 swells the inner wall of the first layer 51 to generate a gelled swelling layer in an initial stage of polymerization. Such swelled layer accelerates the polymerization of the second layer 52 (gel effect). In this embodiment, polymerizable composition poured into the pipe 28 is reacted to the revolving pipe 28 to form a swelled layer, so the polymerizable composition is polymerized. Such process for polymerization is referred to as the rotational gel polymerization process. Note that in this process, the longitudinal direction of the pipe is preferably kept horizontal.

It is preferable to control the reaction speed. For example, the reaction speed is preferable adjusted such that the conversion rate for an hour is 5-90%, more preferably 10-85%, and most preferably 20-80%. The reaction speed is controlled by adjusting the kind of the polymerization initiator, the polymerization temperature, and so forth. Note that any well-known method to measure the conversion rate may be applicable. For example, an experiment is carried out in advance to obtain the relationship between the visual evaluation and the quantitative evaluation of the residual polymerizable compounds by use of a gas chromatography, therefore the conversion rate of the polymerizable composition can be found from the obtained relationship only by visual evaluation. The reaction temperature in the rotational gel polymerization is preferably equal to or smaller than the boiling points of the polymerizable compounds to be used. The rotational speed is preferably adjusted to control the conversion rate or other properties of the layers 51 to 54.

(Heat-drawing Process)

Figure 11:
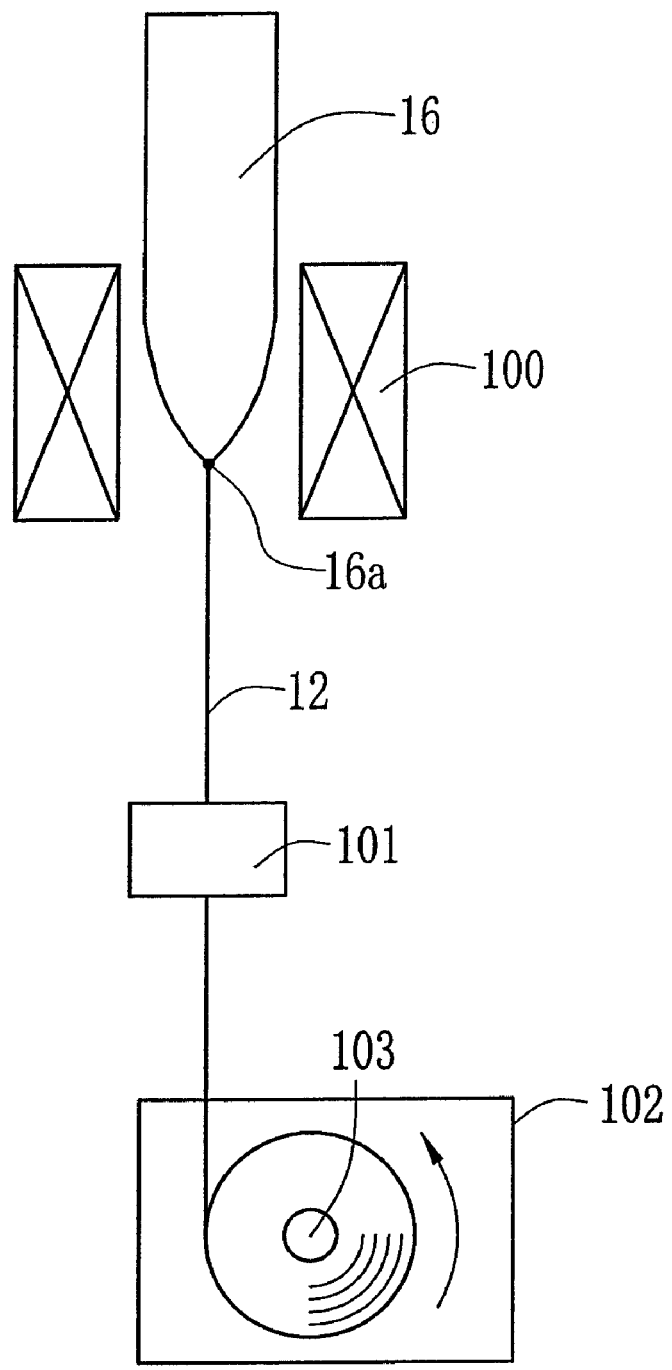
FIG. 11 is an explanatory view showing an outline of a heat-drawing process.

Next, the heat-drawing process 24 in the present embodiment will be described. In the heat-drawing process 24, the preform 16 is positioned in a heating furnace 100 to be heated, as shown in FIG. 11. A lower part of the preform 16 is melt by the heating. Although a set temperature for heating is not limited, it is preferably in a range of 150° C. to 300° C., particularly in a range of 180° C. to 240° C., especially in a range of 190° C. to 220° C. The drawing is started from an end 16a of the molten part, to obtain the POF 12. Then the POF 12 is wound around a winding shaft 103 of a winding device 102. While the drawing, the diameter monitor 101 monitors the diameter of the POF 12, to adjust the position of the preform 16 in relation to the heating furnace 100, the temperature of the heating furnace 100, the winding speed of the winding device 102 and so on. Accordingly, the POF 12 having constant diameter can be obtained from the preform 16. In the heat-drawing process 24, the method described in Japanese Patent Laid-open Publication No. 07-234322 or the like may be used.

By the heat-drawing process 24, the first to third members 13 to 15 contact each other, and the POF 12 having a cross-section similar to that of the preform 16 is formed. In this state, the cavity 58 and the clearances 59 (see FIG. 3) are disappeared. When inside the cavity 58 is decompressed while the heat-drawing process 24, the POF 12 in which bubbles are rarely generated can be produced.

The outer diameter of the POF 12 is determined by a drawing degree of the POF 16. It is preferable that the outer diameter of the outermost shell 67 is controlled without changing the volume of the core 65. Accordingly, the POF 12 having the large diameter can be made without degrading the light transmission performance. In addition, changing of the diameter of the POF 12 can be performed at low cost.

(Covering Process and Assembly Process)

There is a case that the covering process 30 and the assembly process 32 is omitted in the POF cable forming process 10. For example, in the event of the POF cable having single optical fiber, it is possible not to carry out the second covering process and to utilize the optical cable with the outermost layer covered by the first covering process. As for the type of covering, there are a contact type covering in which the covering layer contacts the whole surface of the POF code, and a loose type covering in which a gap is provided between the covering layer and the POF code. When the covering layer of the loose type is peeled for attaching a connector, it is possible that the moisture enters the gap between the POF code and the covering layer and extends in the longitudinal direction of the POF cable. Thus, the contact type covering is preferable.

The loose type covering, however, has the advantage in relaxing the damages caused by stress and heat to the optical fiber cable due to the gap between the covering layer and the POF code. Since the damage to the POF code decreases, the loose type covering is preferably applied to some purposes. It is possible to shield moisture from entering from the lateral edge of the POF cable by filling semi-gelled or powdered material in the gap. If the gelled or powdered material as the filler is provided with the function of improving heat-resistance and mechanical strength, the covering layer with excellent properties can be realized. The loose type covering layer can be formed by adjusting the position of the extrusion nipple of the cross head die, and by controlling the pressure with a decompression device. The thickness of the gap layer between the POF code and the covering layer can be controlled by adjusting the thickness of the nipple and pressure to the gap layer. The covering layer formed on the POF in the first and second covering processes may contain the additives such as flame retardant, ultraviolet absorber, antioxidant, shading agent and lubricant as long as the optical properties of the POF are not affected.

The flame retardants are resin with halogen like bromine, an additive and a material with phosphorus. Metal hydroxide such as aluminum hydroxide or magnesium hydroxide is preferably used as the flame retardant for the purpose of reducing toxic gas emission. The metal hydroxide contains water of crystallization, which is not removed during the manufacture of the POF. Thus the metal hydroxide as the flame retardant is preferably added to the outermost covering layer of the optical cable, not to the covering layer that is directly contacted to the POF 12.

The POF cable 33 may be covered with plural covering layers with multiple functions. Examples of such covering layers are a flame retardant layer described above, a barrier layer to prevent moisture absorption in the POF 12, moisture absorbent to remove the moisture in the POF 12 (for example moisture absorption tape or gel, between the protective layers or in the protective layer).

In addition, as other functional layers, there are a flexible material layer and a styrene forming layer as shock absorbers to relax stress in bending the POF, a reinforced layer to increase rigidity. The thermoplastic resin as the covering layer may contain structural materials to increase the strength of the POF cable. The structural materials are a tensile strength fiber with high elasticity and/or a metal wire with high rigidity. These materials are preferable in terms of improving the mechanical strength of the manufactured POF cable 33.

Examples of the tensile strength fibers are an aramid fiber, a polyester fiber, a polyamid fiber. Examples of the metal wires are stainless wire, a zinc alloy wire, a copper wire. The structural materials are not limited to those listed above. It is also possible to provide other materials such as a metal pipe for protection of the POF cable 33, a support wire to hold the POF cable 55. A mechanism to increase working efficiency in wiring is also applicable to the POF cable 33.

In accordance with the way of use, the POF cable 33 is selectively used as a cable assembly in which the POF codes 31 are circularly arranged, a tape core wire in which the POF codes 31 are linearly aligned, an assembly in which the tape core wires are bundled by using a band or LAP sheath, or the like.

Compared with the conventional optical fiber cable, the POF cable 33 obtained from the preform 16 of the present invention has large permissible error in the core position, and the POF cables 33 may be connected directly. But it is preferable to ensure to fix the end of the POF cable as the optical member according to the present invention by using an optical connector. The optical connectors widely available on the market are PN type, SMA type, SMI type and the like. Therefore, the POF cable 33 of the present invention can be applied to a system to transmit optical signals, which uses optical signal processing devices including optical components, such as a light emitting element, a light receiving element, an optical switch, an optical isolator, an optical integrated circuit, an optical transmitter and receiver module, and the like. Such system may be combined with other optical fibers. Any known techniques can be applied to such system. The techniques are described in, for example, "'Basic and Practice of Plastic Optical Fiber' (issued from NTS Inc.)", "'Optical members can be Loaded on Printed Wiring Assembly, at Last' in Nikkei Electronics, vol. Dec. 3, 2001", pp. 110-127", and so on.

By combining the POF cable 33 according to with the techniques in these publications, the POF cable 33 is applicable to short-distance optical transmission system that is suitable for high-speed and large capacity data communication and for control under no influence of electromagnetic wave. Concretely, the POF cable 33 is applicable to wiring in apparatuses such as computers and several digital apparatuses (for example DVI and HDMI), wiring in trains and vessels, optical linking between an optical terminal and a digital device and between digital devices, indoor optical LAN in houses, collective housings, factories, offices, hospitals, schools, and outdoor optical LAN. In addition, since the POF cable 33 of the present invention has the superior optical properties, such as the high-speed transmittance, maintaining the low transmission loss even when absorbing moisture, and preventing the increase of transmission loss due to the deformation by bending or external pressure. Accordingly, the POF of the present invention can be used for an optical wiring system which requires the constant external pressure to the POF or the plurality of bending of the POF. For example, the POF is preferably used for an optical wiring in mobile phones and an optical rink system in laptop computers.

Further, other techniques to be combined with the optical transmission system are disclosed, for example, in "'High-Uniformity Star Coupler Using Diffused Light Transmission' in IEICE TRANS. ELECTRON., VOL. E84-C, No. 3, MARCH 2001, pp. 339-344", "'Interconnection in Technique of Optical Sheet Bath' in Journal of Japan Institute of Electronics Packaging., Vol. 3, No. 6, 2000, pp. 476-480". Moreover, there are an arrangement of light emitting elements on a waveguide surface (disclosed in Japanese Patent Laid-Open Publication No. 2003-152284), an optical bus (disclosed in Japanese Patent Laid-Open Publications No. 10-123350, No. 2002-90571, No. 2001-290055 and the like); an optical branching/coupling device (disclosed in Japanese Patent Laid-Open Publications No. 2001-74971, No. 2000-329962, No. 2001-74966, No. 2001-74968, No. 2001-318263, No. 2001-311840 and the like); an optical star coupler (disclosed in Japanese Patent Laid-Open Publications No. 2000-241655); an optical signal transmission device and an optical data bus system (disclosed in Japanese Patent Laid-Open Publications No. 2002-62457, No. 2002-101044, No. 2001-305395 and the like); a processing device of optical signal (disclosed in Japanese Patent Laid-Open Publications No. 2002-23011 and the like); a cross connect system for optical signals (disclosed in Japanese Patent Laid-Open Publications No. 2001-86537 and the like); a light transmitting system (disclosed in Japanese Patent Laid-Open Publications No. 2002-26815 and the like); multi-function system (disclosed in Japanese Patent Laid-Open Publications No. 2001-339554, No. 2001-339555 and the like); and various kinds of optical waveguides, optical branching, optical couplers, optical multiplexers, optical demultiplexers and the like. When the optical system having the optical member according to the present invention is combined with these techniques, it is possible to construct an advanced optical transmission system to send/receive multiplexed optical signals. The optical member according to the present invention is also applicable to other purposes, such as for lighting, energy transmission, illumination, lenses and sensors.

The present invention will be described in detail with reference to Experiments. Note that the scope of the present invention is not limited to these Experiments.

EXPERIMENT (1)

According to the POF cable forming process 10, the POF 12 was formed. At first, by the melt-extrusion molding, the pipe 28 of PVDF having the inner diameter of 18.5 mm, the outer diameter of 19.5 mm and the length of 27 cm was formed. The first polymerizable composition was poured into the hollow portion of the pipe 28, through a PTFE membrane-filter having 0.2 μm pore diameter. To prepare the first polymerizable composition, 3FMd7 (hereinafter the content A) of 21.73 ml and PFPMAd5 (hereinafter the content B) of 4.56 ml were mixed as the polymerizable composition, and then 2,2'-dimethyl azobis(isobutyrate) of 0.1 mol % of sum of the content A and the content B and ethyl 3-mercaptopropionate of 0.05 mol % of sum of the content A and the content B were added into the polymerizable composition. In the same process, the second to eleventh polymerizable compositions were prepared according to respective pouring amount shown in Table 1.

The pipe 28 containing the first polymerizable composition was set in the container body 85a in the rotation polymerization device with the longitudinal direction of the pipe 28 being horizontal. The polymerization container 85 of SUS was rotated for 2 hours at 2000 rpm in 90° C. atmosphere to perform heat-polymerization. An isolated thermocouple was provided near the rotating polymerization container 85 (for example, 1 cm to 2 cm distance from the polymerization container 85) to measure the temperature of the polymerization container 85, and the measured temperature was considered as a temperature of heat by the polymerization reaction. The measured exothermic peak of the temperature (heat) was 67° C. at the time after a lapse of an hour and 20 minutes from the start of polymerization. Accordingly, the first layer was formed inside the pipe 28. A conversion rate of the obtained polymer was 90%.

Next, the pipe 28 with the first layer was drawn out from the polymerization container 85, and the second polymerizable composition was poured into the hollow portion of the pipe 28. Then the second layer was formed by rotation polymerization. The polymerization condition and procedure were the same as in forming the first layer. In the same process, the third to eleventh layer was formed by pouring the given amount (shown in Table 1) of third to eleventh polymerizable composition into the pipe 28 for the rotation polymerization.

Blending quantity of 3FMd7 and PFPMAd5 for each of first to eleventh layers, and refractive index of copolymer of each of the first to eleventh polymerizable compositions are shown in Table 1.

TABLE 1

| Pouring order | (3FMd7) (ml) | (PFPMA-d5) (ml) | Refractive index of copolymer (589 nm) |
|---|---|---|---|
| 1 | 21.73 | 4.56 | 1.4324 |
| 2 | 7.57 | 1.99 | 1.4351 |
| 3 | 6.65 | 2.09 | 1.4376 |
| 4 | 5.81 | 2.11 | 1.4397 |
| 5 | 5.04 | 2.07 | 1.4416 |
| 6 | 4.34 | 1.96 | 1.4432 |
| 7 | 3.69 | 1.80 | 1.4445 |
| 8 | 3.09 | 1.60 | 1.4455 |
| 9 | 2.53 | 1.37 | 1.4462 |
| 10 | 1.99 | 1.11 | 1.4467 |
| 11 | 1.48 | 0.83 | 1.4468 |

After polymerizing the eleventh polymerizable composition, the pipe 28 was heated at 90° C. for 6 hours to cause the reaction of residual polymerizable compounds. Then the pipe 28 was removed to obtain the first member 13. The outer diameter of the first member 13 was 18.5 mm.

In the second member forming process 19, the second member 14 was formed by extrusion of DyneonTHV500G (registered trademark: produced by Sumitomo 3M Limited) pellet. The second member 14 was formed into a cylindrical shape having an inner diameter of 18.8 mm and outer diameter of 19.8 mm. The refractive index of the second member 14 was 1.36. In the first combining process 23a, the first member 13 was inserted into the hollow part of the second member 14, to obtain a joint member.

In the third member forming process 20, the third member 15 was formed by melt-extrusion of ACRYPET (registered trademark: produced by Mitsubishi Rayon Co., Ltd.) pellet. The third member 15 was formed into a cylindrical shape having an inner diameter of 20.5 mm and outer diameter of 64.5 mm. The refractive index of the third member 15 was 1.49. In the second combining process 23b, the joint member (obtained in the first combining process 23a) was inserted into the hollow part of the third member 15, to obtain the preform 16.

Figure 12:
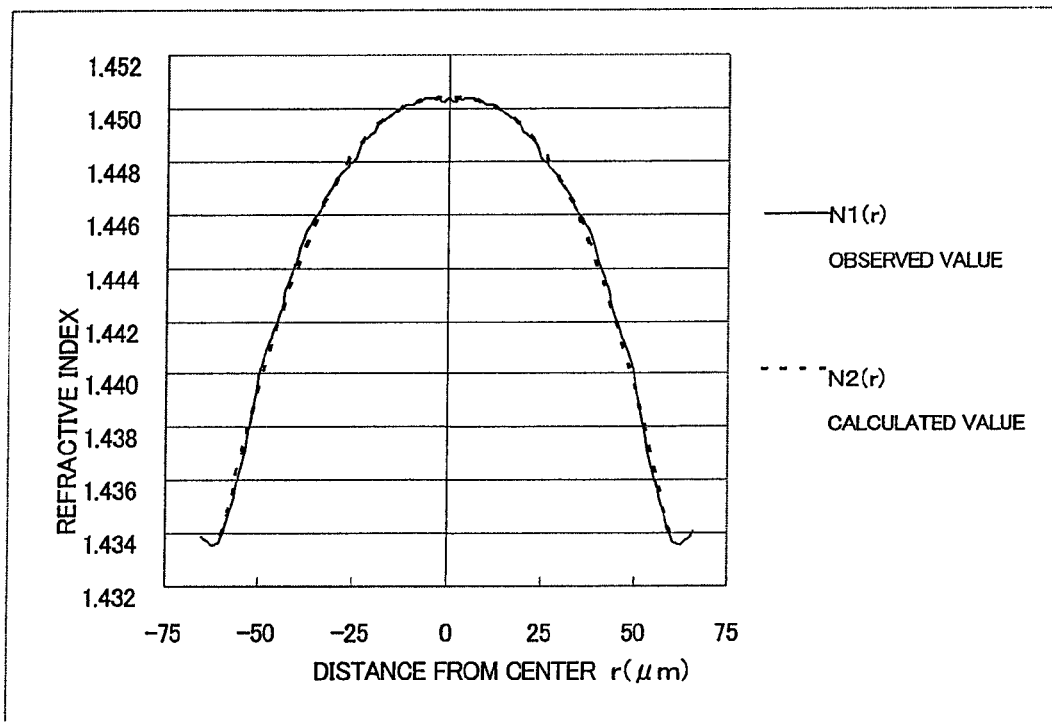
FIG. 12 is a graph showing a refractive index distribution of the plastic optical fiber.

The preform 16 was melt-drawn at 200° C. with decompression in a cavity thereof. Accordingly, the cavity was closed, the first to third members 13 to 15 were tightly in contact and the POF 12 was obtained. The outer diameter of the outermost shell 67 of the POF 40 was 500 μm, and the outer diameter D1 of the core 65 was 125 μm. The length of the POF 12 was 4000 m. A variation of the outer diameter of the POF 12 was ±15 μm. By measuring the refractive index distribution of the POF 12 with use of a transmitted dual-beam interference microscope (TD-20, Mizojiri Optical Co., Ltd.), a refractive index distribution N1(r) shown in FIG. 12 was obtained. In addition, a refractive index distribution N2(r), calculated in conditions that the refractive indices at the center and the periphery of the core 65 were respectively determined as N1 and N2, and the refractive index distribution coefficient g was 2.2 in Equations (1) to (3), is shown in FIG. 12. The N1(r) and N2(r) had an approximately same profile. In other words, it was confirmed that the refractive index distribution (refractive index distribution coefficient g=2.2) satisfying Equations (1) to (3) was formed in the POF 12.

Further, the measured transmission loss value in the POF 12 was 90 dB/km at 650 nm of light source, 54 dB/km at 780 nm, and 75 dB/km at 850 nm.

Figure 13:
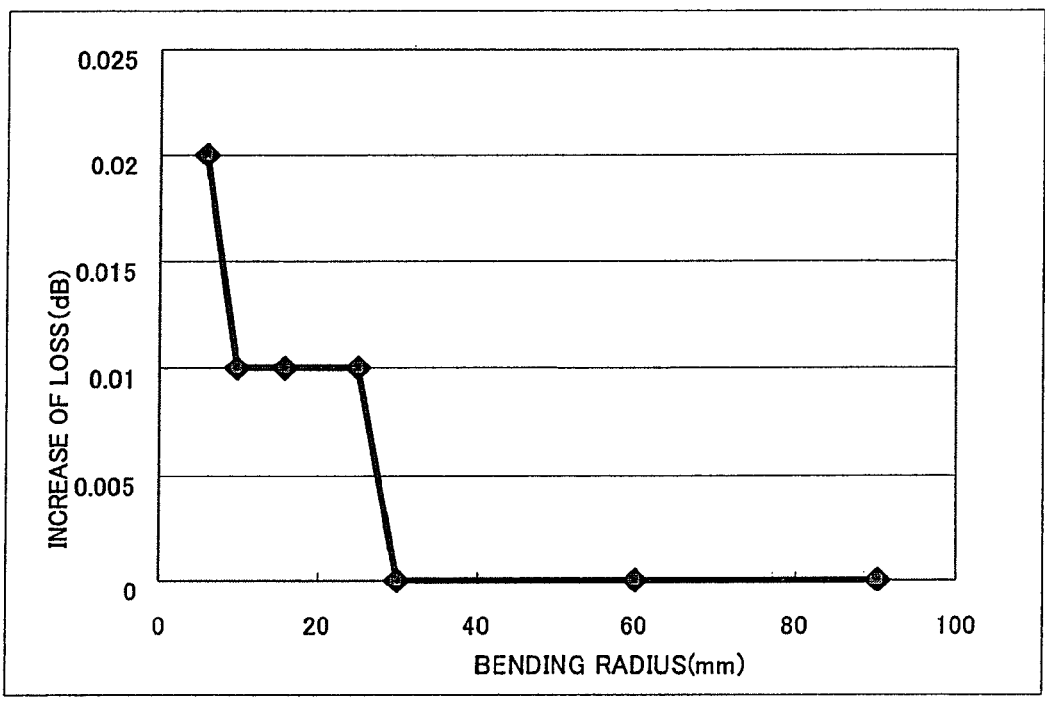
FIG. 13 is a correlation chart of increase of transmission loss of the plastic optical fiber and bending radius in a bending test.

In addition, a bending test in which the POF 12 was bent 360° at various curvature radiuses was conducted. At the bending test, an increase amount of the transmission loss in the POF 12 was measured. When the curvature radius was 10 mm, the increase amount of the transmission loss was 0.02 dB. When the curvature radiuses were 15 mm, 18 mm and 23 mm, the increase amount of the transmission loss was 0.01 dB. When the curvature radius was at least 25 mm, the increase amount of the transmission loss was almost zero (see FIG. 13).

Figure 14:
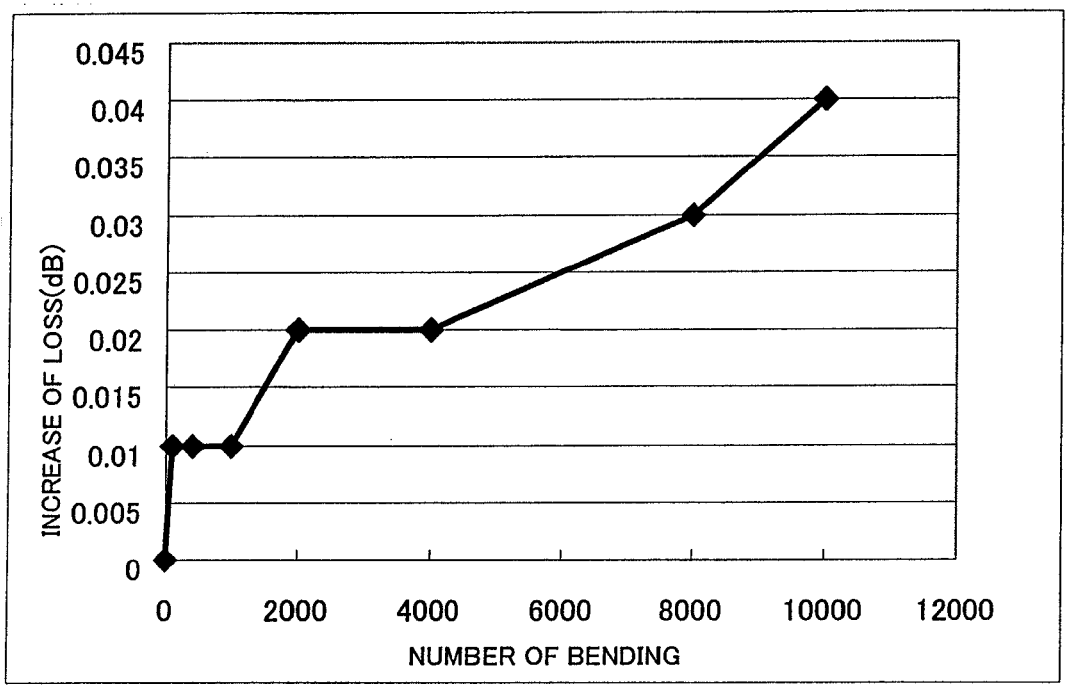
FIG. 14 is a correlation chart of increase of transmission loss of the plastic optical fiber and number of bending in a repetitive bending test.
Figure 15:
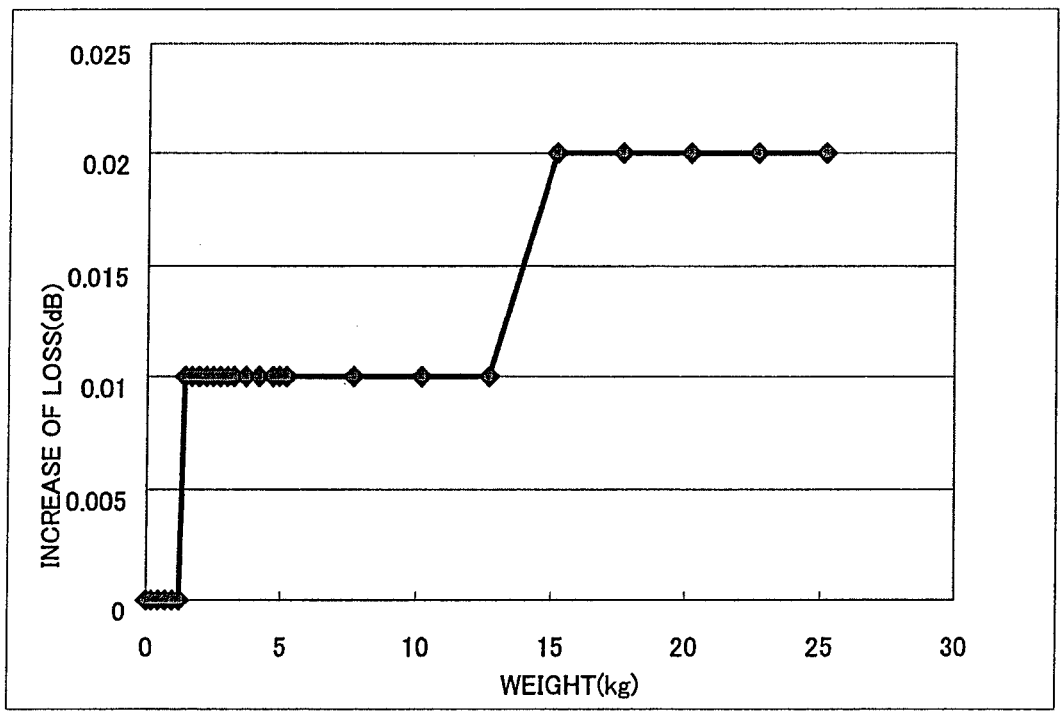
FIG. 15 is a correlation chart of increase of transmission loss of the plastic optical fiber and weight of load applied on a side of the plastic optical fiber.

A repetitive bending test for the POF 12 was conducted. In the repetitive bending test, at second time of 90° bending of the POF 12 at 15 mm curvature radius, the repeat of bending was counted as first time. When the repeat of bending was reached to $10000^{th}$ time, the increase amount of the transmission loss was 0.04 dB (see FIG. 14). In addition, when 25 kg of load was applied on 100 mm length of side surface of the POF 12, the increase amount of the transmission loss was 0.02 dB (see FIG. 15).

EXPERIMENT (2)

Figure 16:
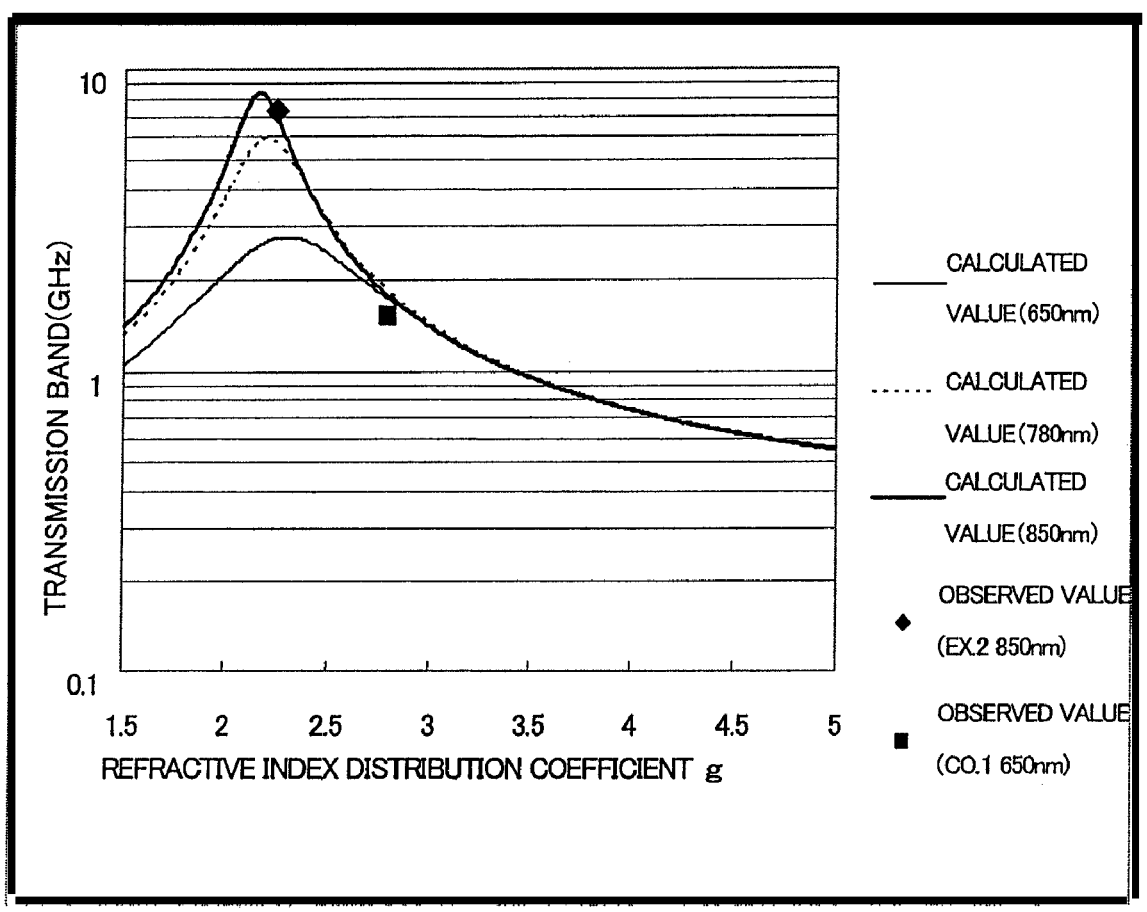
FIG. 16 is a correlation chart of refractive index distribution coefficient g and bandwidth.

The wavelength dependency of the refractive index of the copolymer of 3FMd7 and PFPMAd5 was measured, and relation between a value of the refractive index distribution coefficient g in Equation (1) and the bandwidth was theoretically calculated from the measured result by WKB method. The results of the theoretical calculation at respective wavelengths (650 nm, 780 nm and 850 nm) are shown in FIG. 16. When the bandwidth of 100 m length of the POF 12 obtained by Experiment (1) was measured by time-domain method, the bandwidth was 7.3 GHz at 850 nm wavelength (see FIG. 16). The result shows that the POF 12 of no more than 50 m can perform the 10 Gbps data transmission. In addition, the POF cable 33 of 50 m length including the POF 12 of the Experiment (1) was connected between the light transmitter 71 for generating the 10 Gbps modulation signal and the light receiver 72 for demodulating the 10 Gbps modulation signal. When a first device connected to the light transmitter 71 transmitted particular data to the light transmitter 71, a second device connected to the light receiver 72 received the data from the light receiver 72. Further, while this data communication between the first and second devices, it was confirmed that the data transmission of 10 Gbps was performed between the light transmitter 71 and the light receiver 72. In addition, through observation of communication wave profile with use of an oscilloscope, it was confirmed that a good eye pattern was formed. These fact shows that the refractive index distribution formed in the POF 12 serves to the superior transmission property.

COMPARATIVE EXPERIMENT 1

Predetermined amount of liquid of methyl methacrylate (MMA, in which water is decreased to 100 ppm or less) was poured into a cylindrical polymerization container having the inner diameter of 22 mm and the length of 600 mm. As the polymerization initiator, dehydrated benzoyl peroxide of 0.5 mass. % of the MMA was contained. In addition, as the chain transfer agent, n-butylmercaptan of 0.28 mass. % of the MMA was contained. While the polymerization container was concussed in 70° C. water bath, the MMA solution was subject to preliminary polymerization for 2 hours. Thereafter, the polymerization container was kept horizontally (the axial direction of the cylindrical pot was kept horizontally) at 70° C., and then heat polymerization process was carried out for three hours while rotating the polymerization container at a speed of 3000 rpm. Thereafter, the heat process at 90° C. was performed for 24 hours, so that a cylindrical tube formed of polymethylmethacrylate (PMMA) was obtained.

Next, the MMA (in which water is decreased to 100 ppm or less) as the core material was mixed with diphenyl sulfide as the refractive index controlling agent. The amount of the diphenyl sulfide was 12.5 mass. % of the MMA. After the mixture solution was filtered through membrane filter made from polytetrafluoroethylene with the accuracy of 0.2 μm, the filtered solution was directly poured into the hollow portion of the cylindrical tube. As the polymerization initiator, di-tert-butylperoxide (half life of 10.5 hours at 123.7° C.) of 0.016 mass. % of the mixture solution was added. As the chain transfer agent, dodecylmercaptan of 0.27 mass. % of the mixture solution was added. The cylindrical tube containing this mixture solution was inserted in a glass tube having the diameter larger by 9% than that of the cylindrical tube, and then the glass tube was kept vertically and stationary in a pressure polymerization chamber. Then, in nitrogen atmosphere, the pressure polymerization chamber was pressurized into 0.6 MPa, and the mixture solution was subject to thermal polymerization for 48 hours. The heating temperature in the polymerization was 100° C., which was at least (Tb-10)° C. and no more than Tg° C., when Tb was boiling point of MMA (100° C.) and Tg was glass transition point of PMMA (110° C.). After that, with maintaining the application of the pressure, the mixture solution was subject to thermal polymerization for 24 hours at 120° C., which was at least Tg° C. and no more than (Tg+40)° C. After the thermal polymerization, heat treatment was performed to obtain the preform. Note that the half life of di-tert-butylperoxide is 180 hours at 100° C. and 15 hours at 120° C.

The preform did not have any bubbles that would be generated due to volume shrinkage at the time when polymerization was completed. The preform was heated at 230° C. and drawn to obtain the POF having the diameter of in a range of 700 μm to 800 μm. The measured transmission loss of the POF was 165 dB/km at the wavelength of 650 nm. By measuring the refractive index distribution of the POF with use of the transmitted dual-beam interference microscope (TD-20, Mizojiri Optical Co., Ltd.) and applying the figure (1) to the measured refractive index distribution, a value of g was 2.8. When the bandwidth of 100 m length of the POF obtained was measured by time-domain method with use of 650 nm wavelength of laser light, the bandwidth was 1.5 GHz. The result shows that the POF of at least 0.03 m and no more than 50 m cannot stably perform the 10 Gbps data transmission.

INDUSTRIAL APPLICABILITY

The present invention is preferably applied to a plastic optical fiber utilizing for optical transmission or the like especially a plastic fiber for optical transmission connected to devices requiring large amount of data transmission, and applied to an optical transmission system with use of this plastic optical fiber.

The invention claimed is:

1. A plastic optical fiber comprising a core for transmitting light and an outer shell provided around said core for keeping said light inside said core, said core including:
   a copolymer of a first polymerizable compound shown as following Formula (1) and a second polymerizable compound shown as following Formula (2),
   wherein said core has a refractive index distribution satisfying following Equations (1) and (2) when the center of a cross-sectional circle of said core 65 has a refractive index of N1, an outermost part of said core has a refractive index of N2, a radius of said core is shown as R1 and a refractive index distribution coefficient is shown as g:

$N(r)=N1[1-2\Delta(r/R1)^g]^{1/2}$      [Equation (1)]

$\Delta=(N1^2-N2^2)/(2N1^2)$      [Equation (2)]

[Formula (1)]

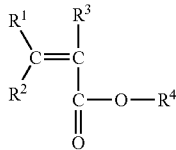

(wherein $R^1$ and $R^2$ each independently represent H or D; $R^3$ represents H, D, $CH_3$, $CD_3$ or a halogen atom; $R^4$ represents an alkyl group having from 2 to 8 carbon atoms and at least one hydrogen atom substituted with a fluorine atom)

[Formula (2)]

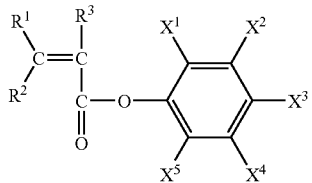

(wherein $R^1$ and $R^2$ each independently represent H or D; $R^3$ represents H, D, $CH_3$, $CD_3$ or a halogen atom; $X^1$ to $X^5$ each independently represent H, D, a halogen atom or $CF_3$, and at least one of $X^1$ to $X^5$ is a halogen atom or $CF_3$).

2. A plastic optical fiber claimed in claim 1, wherein said refractive index distribution coefficient g satisfies following Equation (3):

$2 \leq g \leq 2.3$.      [Equation (3)]

3. A plastic optical fiber claimed in claim 1, wherein said core has a constant outer diameter of in a range of 60 μm to 250 μm.

4. A plastic optical fiber claimed in claim 1, wherein when said plastic optical fiber is bent at a curvature radius of 10 mm and bending angle of 360°, an increase amount of transmission loss is less than 1.0 dB.

5. A plastic optical fiber claimed in claim 1, wherein a value of said transmission loss is in a range of 20 dB/km to 200 dB/km.

6. An optical transmission system comprising:
   said plastic optical fiber claimed in one of claims 1 to 5;
   a light transmitter including a modulator connected to one end of said plastic optical fiber for generating modulation signal of 10 Gbps, and a light source of 850 nm wavelength for outputting optical signal based on said modulation signal; and
   a light receiver including a light detector for detecting said optical signal and outputting said modulation signal based on said optical signal, and a demodulator for performing demodulation of said modulation signal.

7. An optical transmission system claimed in claim 6, wherein said plastic optical fiber has a length of in a range of 0.03 m to 50 m.

8. A manufacturing method for a plastic optical fiber, comprising steps of:
   pouring a polymerizable composition in a hollow portion of a pipe, said polymerizable composition including a third polymerizable compound shown as following Formula (3) and a fourth polymerizable compound shown as following Formula (4);
   polymerizing said polymerizable composition while rotating said pipe around the center of a cross-section circle as a rotational axis, to form a polymer layer inside an inner wall of said pipe;
   additionally performing said pouring step and said polymerizing step one after the other while a ratio of said fourth polymerizable compound toward said third polymerizable compound is gradually increased, to form a core preform in which a plurality of said polymer layers are concentrically stacked inside said pipe;
   forming an outer shell preform having a hole into which said core preform can be inserted, said outer shell preform being formed of a polymer whose refractive index is no more than that of said core preform;
   forming a fiber preform by inserting said core preform into said hole of said outer shell preform; and
   heat-drawing said fiber preform to form a plastic optical fiber comprising a core for transmitting light and an outer shell provided around said core for keeping said light inside said core,
   wherein said core has a refractive index distribution satisfying following Equations (4) and (5) when the center of a cross-sectional circle of said core 65 has a refractive index of N1, an outermost part of said core has a refractive index of N2, a radius of said core is shown as R1, and a refractive index distribution coefficient is shown as g:

$N(r)=N1[1-2\Delta(r/R1)^g]^{1/2}$      [Equation (4)]

$\Delta=(N1^2-N2^2)/(2N1^2)$      [Equation (5)]

[Formula (3)]

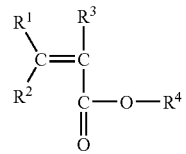

(wherein $R^1$ and $R^2$ each independently represent H or D; $R^3$ represents H, D, $CH_3$, $CD_3$ or a halogen atom; $R^4$ represents an alkyl group having from 2 to 8 carbon atoms and at least one hydrogen atom substituted with a fluorine atom)

[Formula (4)]

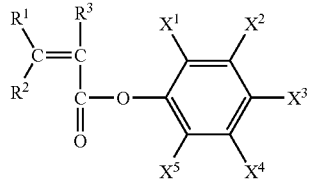

(wherein $R^1$ and $R^2$ each independently represent H or D; $R^3$ represents H, D, $CH_3$, $CD_3$ or a halogen atom; $X^1$ to $X^5$ each independently represent H, D, a halogen atom or $CF_3$, and at least one of $X^1$ to $X^5$ is a halogen atom or $CF_3$).

9. A manufacturing method for a plastic optical fiber claimed in claim 8, wherein said refractive index distribution coefficient g satisfies following Equation (6):

$$2 \leq g \leq 2.3. \qquad \text{[Equation (6)]}$$

\* \* \* \* \*